United States Patent
Reyna et al.

(10) Patent No.: US 11,236,724 B2
(45) Date of Patent: *Feb. 1, 2022

(54) VERTICAL AXIS WIND TURBINE

(71) Applicant: DME Wind Energy Corporation, Fort Collins, CO (US)

(72) Inventors: Sid J. Reyna, Colorado Springs, CO (US); Patrick R. Conarro, Cascade, CO (US); Douglas Bachli, Masonville, CO (US); Darrin Trussell, Masonville, CO (US)

(73) Assignee: DME Wind Energy Corporation, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/841,406

(22) Filed: Apr. 6, 2020

(65) Prior Publication Data

US 2020/0300217 A1 Sep. 24, 2020

Related U.S. Application Data

(63) Continuation of application No. 15/193,659, filed on Jun. 27, 2016, now Pat. No. 10,612,515.

(Continued)

(51) Int. Cl.
*F03D 3/04* (2006.01)
*F03D 3/00* (2006.01)
*F03D 15/00* (2016.01)

(52) U.S. Cl.
CPC .............. *F03D 3/04* (2013.01); *F03D 3/005* (2013.01); *F03D 15/00* (2016.05)

(58) Field of Classification Search
CPC .......... F03D 3/005; F03D 3/02; F03D 3/0409; F03D 3/0427; F03D 3/04; F03D 3/0436;
(Continued)

(56) References Cited

U.S. PATENT DOCUMENTS

| 4,269,563 | A | * | 5/1981 | Sharak | ..................... F03D 15/10 |
| | | | | | 415/186 |
| 6,790,007 | B2 | * | 9/2004 | Gingras | ..................... F03D 3/04 |
| | | | | | 416/183 |

(Continued)

FOREIGN PATENT DOCUMENTS

DE 102009042536 A1 * 4/2011 ........... F03D 3/0409

OTHER PUBLICATIONS

Machine Translation of DE 102009042536A1 [retrieved on Apr. 22, 2021]. Retrieved from: Espacenet. (Year: 2021).*

*Primary Examiner* — J. Todd Newton
*Assistant Examiner* — Eric J Zamora Alvarez
(74) *Attorney, Agent, or Firm* — Sheridan Ross P.C.

(57) ABSTRACT

A vertical axis wind turbine (VAWT) with improved and optimized wind-directing, wind-shaping, and wind-power conversion features is disclosed. The shapes of these features directly affect the ability of the VAWT to use the power of moving air, such as wind, to spin a rotor and create torque on a rotor shaft to generate electricity. The wind-power-conversion mechanical efficiency of the invention is significantly improved over previous efforts, to the point that the invention can convert wind energy into electrical power at a price-to-performance ratio that competes with or surpasses existing alternative energy technologies.

18 Claims, 20 Drawing Sheets

Related U.S. Application Data

(60) Provisional application No. 62/184,742, filed on Jun. 25, 2015.

(58) Field of Classification Search
CPC .......... F03D 3/0472; F03D 1/04; F03D 13/20; F03D 15/00; F05B 2220/30; F05B 2240/12; F05B 2240/213; Y02E 10/74
See application file for complete search history.

(56) References Cited

U.S. PATENT DOCUMENTS

| | | | |
|---|---|---|---|
| 7,329,965 B2 * | 2/2008 | Roberts | F03D 3/061 290/55 |
| 7,969,036 B2 * | 6/2011 | Chung | F03D 9/25 290/55 |

* cited by examiner

VERTICAL AXIS WIND TURBINE

CROSS-REFERENCE TO RELATED APPLICATIONS

This application is a continuation-in-part of U.S. patent application Ser. No. 15/193,659, filed 27 Jun. 2016, which in turn claims the benefit of U.S. Provisional Patent Application 62/184,742, filed 25 Jun. 2015, the entireties of both of which are incorporated herein by reference.

FIELD OF THE INVENTION

This disclosure relates to methods, devices, and systems directed to improving wind directing, shaping, and power conversion, to create torque on a rotor shaft to generate electricity.

BACKGROUND OF THE INVENTION

Although wind power has the potential to provide a large proportion of the world's electricity needs, the variability in the velocity of the wind often makes it an unreliable power source. In particular, this variability makes it difficult to construct wind-driven power-generating devices that are effective and efficient under all wind conditions. By way of non-limiting example, the devices disclosed in U.S. Pat. No. 3,942,909 to Yengst, U.S. Pat. No. 4,632,637 to Traudt, and U.S. Pat. No. 4,818,181 to Kodric concentrate low and moderate winds to produce power and are designed to fold or feather in high winds; while these techniques protect the structural integrity of the device, they also decrease the device's ability to produce power in high winds. Conversely, by way of non-limiting example, the device disclosed in U.S. Pat. No. 5,391,926 to Staley et al. can harness high winds for power production, but is not capable of generating adequate torque for continual, reliable power generation in low or moderate winds.

One offered solution for the problem of variable wind velocity has been the vertical axis wind turbine (VAWT). Unlike horizontal axis (propeller-type) windmills, VAWTs pivot about a long vertical axis, such that they may face directly into a wind. A VAWT, therefore, can harness wind energy from large columns of air, making them practical for power generation in low and moderate winds. When combined with features that allow a wind-driven power generator to operate robustly in high winds, a VAWT can be used to generate power in a wide range of wind conditions. By way of non-limiting example, one such device is disclosed in U.S. Pat. No. 6,538,340 to Elder. However, given their relative complexity compared to horizontal axis windmills, VAWTs continue to suffer from lower cost efficiency than other alternative energy technologies.

There is a long-felt need for VAWT devices with improved cost efficiency, which preferably would provide continual, reliable power generation in all wind conditions at costs comparable to other alternative energy generation methods, devices, and systems.

SUMMARY OF THE INVENTION

Certain embodiments include a vertical axis wind turbine, comprising at least one rotor blade, turning a shaft; at least one rotor plate, attached to the at least one rotor blade at one or more of a top and a bottom of the at least one rotor blade; a rotationally symmetric stator skirt, supporting the at least one rotor plate and comprising N identical trapezoidal panels, each trapezoidal panel forming an angle $\alpha$ relative to a horizontal axis, the stator skirt having a horizontal cross-section of a regular polygon having N sides; at least one stator fin, each stator fin being attached at a bottom of the stator fin to the stator skirt and comprising a fin flip, the fin flip being forming an angle $\beta$ relative to a longitudinal axis of the stator fin and adapted to compress wind and direct the wind to the rotor blades in a predetermined direction; and a top frame, attached to a top of each stator fin.

In some embodiments, the predetermined direction is clockwise. In other embodiments, the predetermined direction is counterclockwise.

In certain embodiments, the at least one rotor blade may comprise three rotor blades. In some of these embodiments, each of the three rotor blades is disposed at an angle of 120° relative each of the other two rotor blades.

In certain embodiments, each of a leading vertical face and a trailing vertical face of each rotor blade may be semielliptical. In some of these embodiments, a distance between the leading vertical face and the trailing vertical face may be greatest at a center of each face, such that the horizontal cross-section of the rotor blade is a crescent. In other embodiments, a distance between the leading vertical face and the trailing vertical face may be uniform, such that the horizontal cross-section of the rotor blade is of constant width.

In some embodiments, the at least one stator fin may comprise three stator fins. In other embodiments, the at least one stator fin may comprise six stator fins.

In some embodiments, the at least one stator fin may be disposed in an arrangement that is rotationally symmetric about the shaft. By way of non-limiting example, the at least one stator fin may comprise three stator fins spaced 120° apart, or may comprise six stator fins spaced 60° apart.

In some embodiments, $\beta$ may be between about 15° and about 75°, more preferably between about 30° and about 60°, and most preferably about 45°.

In some embodiments, a length of each fin flip may be about 2 inches.

In some embodiments, N may be between 3 and 9, more preferably between 4 and 8, and most preferably 6.

In some embodiments, $\alpha$ may be between about 12° and about 80°, more preferably between about 24° and about 70°, and most preferably about 36° or about 60°.

In some embodiments, the rotor blades may be separate components, each attached to the at least one rotor plate but not attached to the other rotor blades. In other embodiments, the rotor blades may be interconnected to form a unitary rotor.

In some embodiments, the at least one rotor plate may comprise two or more rotor plates, the two or more rotor plates being vertically stacked and independently moveable.

In some embodiments, at least one rotor plate may have at least one gap or hole to allow vertical air flow.

In certain embodiments, the vertical axis wind turbine may further comprise an amplifier skirt, disposed on a top of the vertical axis wind turbine and attached to the top frame. The amplifier skirt may be, but need not be, a "mirror image" of the stator skirt.

In some embodiments, the at least one rotor blade may have a diameter greater than a radius of the at least one rotor plate to which the at least one rotor blade is attached.

Various embodiments of the present invention are directed to wind turbine designs that employ both aerodynamic lift and drag forces, in concert with back pressure relief, in a consolidated vertical-axis wind turbine apparatus utilizing stator and rotor blades so as to provide an omni-directional vertical-axis wind turbine, having an increased capacity to convert wind energy to electrical energy. The stator blades are designed, adapted and configured do reduce back pressure, while providing a means for effectively transferring torque to the rotor blades, which in certain embodiments, are designed as bidirectional airfoils, and therefore, are conducive to the laminar conduction of wind through or around the device. In preferred embodiments, oncoming wind that is oriented nearly perpendicular to the stator is shaped in a desired fashion to achieve channeling of the wind into the interior of the device so as to rotate the rotor by being directed (e.g. via the flip angle of the end of a stator) so as to achieve desired overall operating efficiencies and to increase the wind directional aggregate of the device.

The shapes of blades employed can vary, but are preferably selected to be conducive to the laminar flow of wind through the device, with stator and bade configurations selected to maximize the induced torque potential and to improve attack angles. The stator/rotor combination is therefore selected to be effective for increasing both wind speed and pressure, by means of the conservation of angular momentum.

In certain embodiments, the device is devoid of a rounded, symmetrical base unit (or top unit), with some such designs instead employing particular linear surfaces in a manner to direct incoming wind to effectively achieve desired attack angles to the rotor so as to maximize efficiencies. Certain embodiments include a housing that includes a top coupled to a bottom via one or more optional supports, which may include stator elements. The housing may include surfaces adapted to direct wind from outside the housing to inside the housing toward the rotor. While the housing may be surrounded by a net or screen, preferred embodiments eliminate the same. In other embodiments, a top structure is provided that is generally symmetrical and the mirror image of the base unit, such that the same linear surfaces are designed to funnel and direct and shape the wind into the interior of the device. While the top-most surface of the top of the device may be curved to direct water or outside air as desired, in other embodiments the top surface is relatively flat so as to accommodate the stacking of at least two units atop each other. In such a manner, a user can decide to stack units to achieve higher vertical structures, with wind energy generation possible at each level, thus adding some redundancy to the overall system, and also providing the ability to slightly change the internal and working components of the individual units to adjust for differences in wind conditions. For example, different sized and shaped rotors or stators can be employed with two stacked units, thus facilitating some variety of performance between the two units in any given wind condition experienced. In some stacked configurations, the air from one unit may be directed advantageously into the other unit.

Various embodiments of the present invention include a plurality of wind turbine diffusers to increase the velocity of the air entering the turbine's rotor plane, thus increasing the power output and efficiency by having air being accelerated over the turbine rotor blades.

In certain embodiments a static diffuser about a horizontal axis, but rotatable about the vertical axis, may be employed, and in still other embodiments, the diffuser further comprises one or more vent structures located on the exterior surface.

In aspects of the present disclosure, a vertical axis wind turbine comprises at least one rotor blade, turning a shaft; a rotationally symmetric stator skirt, wherein at least a portion of a wind-facing surface of the stator skirt is parabolic, and wherein the stator skirt has a horizontal cross-section of an ellipse; and at least one stator fin, each stator fin being attached at a bottom of the stator fin to the stator skirt and comprising a fin flip, the fin flip being disposed at an angle of $\beta$ relative to a longitudinal axis of the stator fin and adapted to compress wind and direct the wind to the rotor blades in a predetermined direction.

In embodiments, the predetermined direction may be counterclockwise.

In embodiments, the at least one rotor blade may comprise three rotor blades.

In embodiments, at least one of a leading vertical face and a trailing vertical face of each rotor blade may be arcuate or parabolic.

In embodiments, the at least one stator fin may comprise three stator fins.

In embodiments, the wind-facing surface of the stator skirt may comprise a lower conical portion and an upper parabolic portion.

In embodiments, an angle $\alpha$ between the wind-facing surface of the stator skirt and a horizontal axis, as measured by an average or at any point of the stator skirt, may be less than about 45° or more than about 55°. The angle $\alpha$ may, but need not, be between about 35° and about 40° or between about 55° and about 65°.

In embodiments, the ellipse may be a circle.

In embodiments, the vertical axis wind turbine may have a height-to-width ratio of between about 0.1 and about 3.0.

In aspects of the present disclosure, a vertical axis wind turbine comprises at least one rotor blade, turning a shaft; a rotationally symmetric stator skirt, wherein at least a portion of a wind-facing surface of the stator skirt is parabolic, and wherein the stator skirt has a horizontal cross-section of an ellipse; a rotationally symmetric amplifier skirt, wherein at least a portion of a wind-facing surface of the amplifier skirt is parabolic, and wherein the amplifier skirt has a horizontal cross-section of an ellipse; and at least one stator fin, each stator fin being attached at a bottom of the stator fin to the stator skirt and comprising a fin flip, the fin flip being disposed at an angle of $\beta$ relative to a longitudinal axis of the stator fin and adapted to compress wind and direct the wind to the rotor blades in a predetermined direction.

In embodiments, at least one of a leading vertical face and a trailing vertical face of each rotor blade may be arcuate or parabolic.

In embodiments, the wind-facing surface of the amplifier skirt may comprise an upper conical section and a lower parabolic section.

In embodiments, at least one of the ellipse of the stator skirt and the ellipse of the amplifier skirt may be a circle.

In embodiments, the vertical axis wind turbine may have a height-to-width ratio of between about 0.1 and about 3.0.

In aspects of the present disclosure, a vertical axis wind turbine comprises at least one rotor blade turning a shaft; at least one rotor plate attached to the at least one rotor blade at one or both of a top and a bottom of the at least one rotor blade; a rotationally symmetric stator skirt, supporting the at least one rotor plate and comprising N identical trapezoidal panels, each trapezoidal panel forming an angle $\alpha$ with respect to a horizontal axis, the stator skirt having a horizontal cross-section of a regular polygon having N sides; at least one stator fin, each stator fin being attached at a bottom of the stator fin to the stator skirt and comprising a fin flip, the fin flip being disposed at an angle of $\beta$ relative to a longitudinal axis of the stator fin and adapted to compress wind and direct the wind to the rotor blades in a predetermined direction; and a top frame, attached to a top of each stator fin, wherein α is less than about 45° or more than about 55°.

In embodiments, the predetermined direction may be counterclockwise.

In embodiments, the at least one rotor blade may comprise three rotor blades.

In embodiments, each of a leading vertical face and a trailing vertical face of each rotor blade may be semielliptical.

In embodiments, the at least one stator fin may comprise three stator fins.

The present invention generally comprises a wind turbine that permits a large fraction of the energy of incident wind to be converted to useful work. The unique construction of the wind turbine thus yields a more efficient wind turbine that is adaptable to many uses, including not only energy generation form wind, but from water in tidal applications.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention. It is important, therefore, that the claims be regarded as including any such equivalent construction insofar as they do not depart from the spirit and scope of the present invention.

The advantages of the present invention will be apparent from the disclosure contained herein.

For purposes of further disclosure and to comply with applicable written description and enablement requirements, the following references generally relate to methods, devices, and systems directed to improving wind directing, shaping, and power conversion, to create torque on a rotor shaft to generate electricity, and related methods, devices, and systems, and are hereby incorporated by reference in their entireties:

U.S. Pat. No. 3,942,909, entitled "Vertical axis fluid driven rotor," issued 9 Mar. 1976 to Yengst ("Yengst"). Yengst describes a vertical axis rotor comprising curved vanes overlapping in their diameters and attached to a shaft, a pair of spaced-apart end plates adapted to hold and permit rotation of the shaft to which the vanes are attached, and means for weighting an edge of the vanes comprising a plurality of tubes, each tube being positioned along the outer edge of each vane and connected to a source of liquid so that as the shaft and vanes rotate, fluid rises in the tubes.

U.S. Pat. No. 4,632,637, entitled "Wind turbine," issued 30 Dec. 1986 to Traudt ("Traudt"). Traudt describes a wind turbine device having a main rotatable driven shaft, a plurality of elongated blades operatively mounted on the main shaft for unitary rotation with the main shaft, the blade extending substantially radially away from the main shaft and adapted to fold downwind under naturally occurring forces and simultaneously feather in direct response to the folding movement, and means associated with the blades for increasing the rate of fold relative to the rate of feather as the speed of rotation increases.

U.S. Pat. No. 4,818,181, entitled "Wind turbine," issued 4 Apr. 1989 to Kodric ("Kodric"). Kodric describes a wind turbine comprising a housing pivotally positioned atop a support structure; a hub rotatably positioned at one end of the housing; at least two arm members, attached to and radiating outwardly from the hub and being spaced equally from one another, each having an identical structure comprising an inner arm portion and an outer arm portion at an angle of from 75° to 105° to the inner portion, the arm members being oriented in the same substantially vertical plane; a vane pivotally attached to each outer arm portion; means for biasing the pitch angle of each vane about its outer arm portion to catch the wind and thereby impart rotation to the hub; and means for orienting the housing so that the vanes may catch the wind.

U.S. Pat. No. 5,391,926, entitled "Wind turbine particularly suited for high-wind conditions," issued 21 Feb. 1995 to Staley et al. ("Staley"). Staley describes double-curved, stationary stators for more effectively directing currents into a rotor assembly to impart a higher rotational velocity and greater torque upon the turbine shaft. In addition, the stationary stators provide a structural integrity necessary for operation during high-wind conditions. This aspect also prevents the disruption of rotation by shielding the rotors from winds counter-directional to their rotation which may occur as the wind shifts.

U.S. Pat. No. 6,172,429, entitled "Hybrid energy recovery system," issued 9 Jan. 2001 to Russell ("Russell"). Russell describes double speed Savonius rotor electrical generating apparatuses, each of which includes two Savonius type rotors mounted adjacent to one another for rotation about a common axis with the blades of the rotor units being arranged so that the rotor units rotate in opposite directions relative to one another under the influence of a given wind or flow of water.

U.S. Pat. No. 6,538,340, entitled "Wind turbine system," issued 25 Mar. 2003 to Elder ("Elder"). Elder describes an improved lightweight vertically rotating wind turbine having enhanced conversion of wind kinetic energy into usable energy, comprising a wind-collecting base with a bottom surface defining an area and a top surface defining an area, wherein the area of the bottom surface is larger than the area of the top surface, the top surface comprises an energy-transfer element, and the wind-collecting base comprises an upward tapered base having an angle to smoothly direct wind currents; a vertically rotating shaft with a top end and a bottom end, wherein the bottom end is mechanically connected to the energy-transfer element; an energy-utilizing device responsive to the shaft through the energy-transfer element of the top surface of the base; a top plate attached in the vicinity of the top end of the vertically rotating shaft; a bottom plate that defines a diameter and is attached to the vertically rotating shaft at a location above the top surface of the base; a plurality of vertically oriented torque generating elements having outer edges and inner edges which are located circumferentially around the vertically rotating shaft between the top plate and the bottom plate and are attached to the round top plate and the round bottom plate at their ends to form a cage assembly; a plurality of vertically oriented flat wind directing elements arranged circumferentially around the cage assembly and adjacent to the outer edges of the vertically oriented flat torque generating elements; an open cover comprising concentric braces comprising two side bearings; and a top shield having a central pivoting point and an outer terminus above the side bearings of the open cover, wherein the wind turbine elements are constructed from lightweight materials which allow the enhanced conversion of wind kinetic energy into mechanical energy by the wind turbine.

U.S. Pat. No. 6,638,005, entitled "Coaxial wind turbine apparatus having a closeable air inlet opening," issued 28 Oct. 2003 to Holter et al. ("Holter"). Holter describes a coaxial wind turbine apparatus including a pair of rearwardmounted, spring-loaded fins to orient the air inlet opening to face the direction of the oncoming wind and close a damper panel or shutter array at the air inlet opening during very high wind conditions.

U.S. Pat. No. 6,740,989, entitled "Vertical axis wind turbine," issued 25 May 2004 to Rowe ("Rowe"). Rowe describes a vertical axis wind turbine comprising a turbine rotor with rotor blades disposed for rotation about a substantially vertical axis; and a plurality of vertically extending stator vanes circumferentially spaced apart about the rotor in an annular array, each vane having a radially inward facing surface, a radially outward facing surface, and a flange on an outer edge of each vane.

U.S. Pat. No. 6,984,899, entitled "Wind dam electric generator and method," issued 10 Jan. 2006 to Rice ("Rice"). Rice describes a wind generator for generating electricity in response to wind flow, comprising a windmill comprising a shaft; a plurality of blades secured to the shaft; at least two moveable air foils which form an adjustable size opening for directing a selectable amount of wind flow into the plurality of blades; a base supporting the at least two air foils, the base being rotatably mounted for orienting the at least two air foils into the wind flow; a ring gear mechanically affixed to the shaft; and a plurality of generators arranged for mechanical interconnection with the ring gear.

U.S. Pat. No. 7,329,965, entitled "Aerodynamic-hybrid vertical-axis wind turbine," issued 12 Feb. 2008 to Roberts et al. ("Roberts"). Roberts describes a vertical axis wind turbine which includes a rotor airfoil and stator blade combination. The rotor airfoils have a horizontal cross-section with a crescent shape including a convex leading side and a concave trailing side with a thicker middle section that tapers to narrower sections at ends. The stator blades have a horizontal cross-section with a planar side and a convex side. Rotor airfoil and stator blade combinations are secured between upper and lower annular sails.

U.S. Pat. No. 7,347,660, entitled "Cross-flow wind turbine," issued 25 Mar. 2008 to Taylor et al. ("Taylor"). Taylor describes cross-wind turbines wherein an airfoil stator causes wind to accelerate along its surface and creates a low pressure area on the leading face of the rotor blade during the power stroke. A blocking stator blocks wind from impeding the movement of the rotor blades during the return cycle and directs wind onto the trailing face of the rotor blades during the power cycle. A large pressure differential is created between the leading face of the rotor blade and the trailing face of the rotor blade during the power cycle which creates a large amount of force that rotates the rotor blade about the central shaft.

U.S. Pat. No. 7,573,148, entitled "Boundary layer wind turbine," issued 11 Aug. 2009 to Nica ("Nica"). Nica describes a wind turbine comprising a stator assembly having a plurality of stator blades for tangentially redirecting wind into an enclosure formed by the stator blades; and a rotor assembly positioned within the enclosure formed by the stator blades, the rotor assembly having a plurality of stacked disks connected to a shaft means, the stacked disks being closely spaced from each other so as to create, in use, a boundary layer effect on surfaces of the disks that contributes in rotating the disks, each disk having a plurality of rotor blades disposed on an outer circumference thereof, each disk defining at least one opening thereon for redirecting the wind axially through each of the disks; whereby, in use, the stator blades redirect the wind tangentially to the rotor assembly and entirely within the enclosure formed by the stator blades before the wind is redirected axially through each of the disks.

PCT Application Publication No. 2010/003955, entitled "Wind turbine apparatus," published 3 Feb. 2011 to Blafield et al. ("Blafield"). Blafield describes a wind turbine apparatus comprising a generator and a substantially vertical shaft, the shaft being directly mounted to the generator for rotating the generator. At least one lightweight vane member is also provided. The at least one vane member is attached to the shaft to provide a twisted self starting rotor unit. An electronic control apparatus is provided for controlling the speed of rotation of the generator.

U.S. Patent Application Publication No. 2012/0099994, entitled "Vertical-axis wind rotor," published 26 Apr. 2012 to Eguizabal ("Eguizabal"). Eguizabal describes a wind rotor with a vertical shaft, of the type which incorporates a pair of supports suitably fixed at the ends of the shaft thereof, which supports form the support means for a plurality of blades aligned circumferentially about the shaft, comprising two types of blades with an identical or similar main aerodynamic profile, vertically projected with advanced rotational displacement and twisted and with a shortened chord in the opposite direction, one blade configured for drag and another blade configured for lift, the chords of the blades being oriented at an angle, radially, uniformly, concentrically, and vertically at the base of the rotor, with the leading edge outward, alternately and equidistantly arranged at the lower base thereof.

U.S. Pat. No. 8,232,664, entitled "Vertical axis wind turbine," issued 31 Jul. 2012 to Stroup et al. ("Stroup"). Stroup describes a vertical axis wind turbine for generating electricity comprising a tower base; a tower frame attached to the base; a vertically extending wind turbine mounted in the tower frame and having a central shaft and a plurality of wind blades attached thereto, the shaft being attached to an electric generator for producing electricity therefrom upon rotation of the shaft; a plurality of diverter doors, each diverter door being movably connected to the tower frame adjacent the wind turbine, the plurality of diverter doors being movable to seal the wind turbine in a housing formed by the plurality of diverter doors when winds exceed a predetermined velocity; and a plurality of electric motors, one of the electric motors being coupled to each of the diverter doors to variably position the coupled diverter door relative to each other diverter door for controlling air flow to the turbine, whereby a vertical standing wind turbine generates a controlled electrical output while controlling air flow to the wind turbine and being protected against storms by the individual movement of each of a plurality of diverter doors.

U.S. Pat. No. 8,354,756, entitled "Vertical axis turbine to generate wind power," issued 15 Jan. 2013 to Ellis ("Ellis"). Ellis describes an apparatus, comprising an axle extending along a center axis, and a plurality of cup shaped blades coupled to the axle around the center axis, each blade comprising a concave face having a parabolic concavity along a plane parallel to the center axis, the parabolic concavity having a first focus and a first vertex; and a convex tail having an exterior surface that is parabolic along the plane parallel to the center axis, the exterior surface having a second focus coincident the first focus in the plane and a second vertex in the plane, wherein a distance between the first focus and the first vertex is less than a distance between the second focus and the second vertex.

U.S. Patent Application Publication No. 2013/0287570, entitled "Self-starting Savonius wind turbine," published 31 Oct. 2013 to Gdovic ("Gdovic"). Gdovic describes a self-starting Savonius wind turbine including a frame, a rotor assembly that is rotatable about a central axis of rotation, and an energy utilizing device operably connected to the rotor assembly. The rotor assembly has at least two rotors, each rotor having at least two rotor blades. Rotation of the rotor assembly is initiated by wind coming from any direction blowing on any one of the plurality of blades. The rotors are configured in a stacked orientation with the blades fixed at a rotated angular position relative to one another to start rotation of the rotor assembly in variable wind conditions.

U.S. Patent Application Publication No. 2014/0044535, entitled "Wind turbines augmented with rotating diffusers," published 13 Feb. 2014 to Wood ("Wood I"). Wood I describes a diffuser-augmented wind turbine including a first diffuser ring arranged to form a turbine rotor cowling, the diffuser being fixed to and rotatable with the turbine rotor about the horizontal axis of the wind turbine. The first diffuser ring may have one or more dynamic, aero-elastic, vortex entrainment devices attached to a trailing edge of the diffuser. The first diffuser ring may include one or more slot gaps arranged within its body, each slot gap creating a channel between the interior and exterior surfaces of the first diffuser ring.

U.S. Patent Application Publication No. 2014/0227092, entitled "Diffuser augmented wind turbines," published 14 Aug. 2014 to Wood ("Wood II"). Wood II describes a wind turbine diffuser with an expanded outlet area in which the diffuser outlet area is greater than its cross sectional area. The diffuser may be formed of one or more diffuser rings, at least one of which may form a turbine cowling. Each diffuser ring may have an inlet area that is smaller than the outlet area of the directly upstream ring. The portion of an upstream ring outlet which is not occluded by the downstream ring may form a diffuser outlet such that the total outlet area of the diffuser is larger than the cross-sectional area.

U.S. Pat. No. 8,829,704, entitled "Wind turbine generator and motor," issued 9 Sep. 2014 to Grigg ("Grigg"). Grigg describes a parallel and vertical axis turbine including a plurality of wing assemblies having vertical pivot shafts extending between two vertically spaced end assemblies that are joined to a central driveshaft assembly. The wing assemblies are rotatable about their respective pivot axes from a drive position in which they extend radially outwardly from the central axis and transverse to incident fluid flow to maximally capture fluid flow and rotate the turbine, to a glide position in which the wings extend tangentially to the direction of rotation and parallel to incident fluid flow to minimize drag.

U.S. Patent Application Publication No. 2014/0356180, entitled "Wind turbine for facilitating laminar flow," published 4 Dec. 2014 to Oelofse ("Oelofse"). Oelofse describes a circular-oriented laminar flow facilitating turbine, comprising at least leading and trailing circumferentially distributed foils, which rotate about an axis and are sized and spaced to facilitate a laminar flow between the foils, the foils having leading edges at distances R1 and R2, respectively, from the axis, the foils having chords C1 and C2, respectively, and the foils being spaced apart by a distance S, wherein R2 is within 10% of R1 and C2 is within 10% of C1, R1:C1 is between 2.9 and 3.5 inclusive, C1:S is at least 3:1 inclusive, and the leading foil has a high pressure portion and a low pressure portion, wherein at least 90% of the high pressure portion is curved in a manner that facilitates the laminar flow.

U.S. Patent Application Publication No. 2015/0063978, entitled "Wind turbine," published 5 Mar. 2015 to Poole ("Poole"). Poole describes a vertical axis wind turbine system that converts wind energy into electrical or mechanical energy, comprising at least one turbine rotor with a plurality of blades for receiving head-on wind generated airflow, at least some of the blades moving in a downstream wind direction and some of the blades moving in a return upwind direction as the rotor rotates; a rotor support structure mountable to a base or support for holding the at least one rotor in the wind generated airflow; and wind shield means mountable upwind of at least a portion of the rotor to protect the return blades from head-on wind airflow.

U.S. Patent Application Publication No. 2015/0086366, entitled "Wind turbine blade and blade hub," published 26 Mar. 2015 to Barnes et al. ("Barnes"). Barnes describes a Darrieus-type vertical axis wind turbine comprising a vertical tower supported for rotation, and one or more blades each connected to the tower causing rotation in response to wind energy therewith, wherein each blade has an upper root end connected to the top of the tower by a separable blade hub and a lower root end connected to the bottom of the tower by a separable blade hub.

U.S. Patent Application Publication No. 2015/0152840, entitled "Dual-turbine wind power station placed on a vertical axis," published 4 Jun. 2015 to Varga et al. ("Varga"). Varga describes a dual-turbine wind power station arranged on a vertical axis, comprising a machine housing constructed over a solid base; an internal rotor comprising one or more blades; an internal shaft having a lower set of bearings at a point on its lower end and an upper set of bearings at a point on its upper end, both of which provide for rotational motion of the shaft about the vertical axis of the internal shaft, the lower end of which is connected to a first electric energy-producing electrical machine either directly, or with the aid of a first transmission device; an external rotor which rotates in a direction opposite to that of the internal rotor comprising one or more blades, an external shaft which rotates about the vertical axis it shares with the internal rotor, the external shaft having a lower set of bearings at a point on its lower end and an upper set of bearings at a point on its upper end, both of which provide for rotational motion of the shaft about the vertical axis of the external shaft, wherein the lower shaft end of the internal rotor is placed into the lower shaft end of the external rotor and the lower end of the external shaft is connected to a second electric energy-producing electrical machine either directly, or via a second transmission device;

and an oval support structure comprising a grid-like shell that surrounds the internal rotor and external rotor.

As may be understood by those of ordinary skill in the art, certain components or features of the foregoing references may be incorporated and used in embodiments of the present disclosure. By way of non-limiting example, particular shapes or arrangements of blades, materials used to construct devices, or device sizes as disclosed in the prior art may be incorporated into embodiments of the present disclosure, and such uses are within the scope of this disclosure.

In various embodiments of the present invention, the blade design has both drag and lift characteristics. In some embodiments, an open rotor design allows for the lift feature to be taken advantage of. Specifically, an open rotor design permits air to flow over the blades to fully develop the lift and does not limit the flow to adjoining blades.

In various embodiments of the present invention, the stator skirt design amplifies and accelerates the wind speed into the rotor. This is important because the power output of a wind turbine scales with the cube of the wind speed, e.g. a twofold increase in the wind speed results in an eightfold increase in available power. The VAWTs of the present invention can rotate even at very low wind speeds as a result of the wind speed amplification provided by the stator skirt.

In various embodiments of the present invention, stator fins direct the wind in the direction of blade rotation and have a major impact on the overall torque efficiency.

In various embodiments of the present invention, an open frame design allows the entire rotor-stator system to receive wind energy from any direction. Wind varies greatly in direction and velocity on a continuous basis, and also exhibits rolling and swirling vortices. The VAWTs of the present invention can respond instantaneously to any change in wind direction or velocity.

As used herein, "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

It is to be noted that the term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The embodiments and configurations described herein are neither complete nor exhaustive. As will be appreciated, other embodiments of the invention are possible utilizing, alone or in combination, one or more of the features set forth above or described in detail below.

DETAILED DESCRIPTION OF THE INVENTION

Figure 1A:
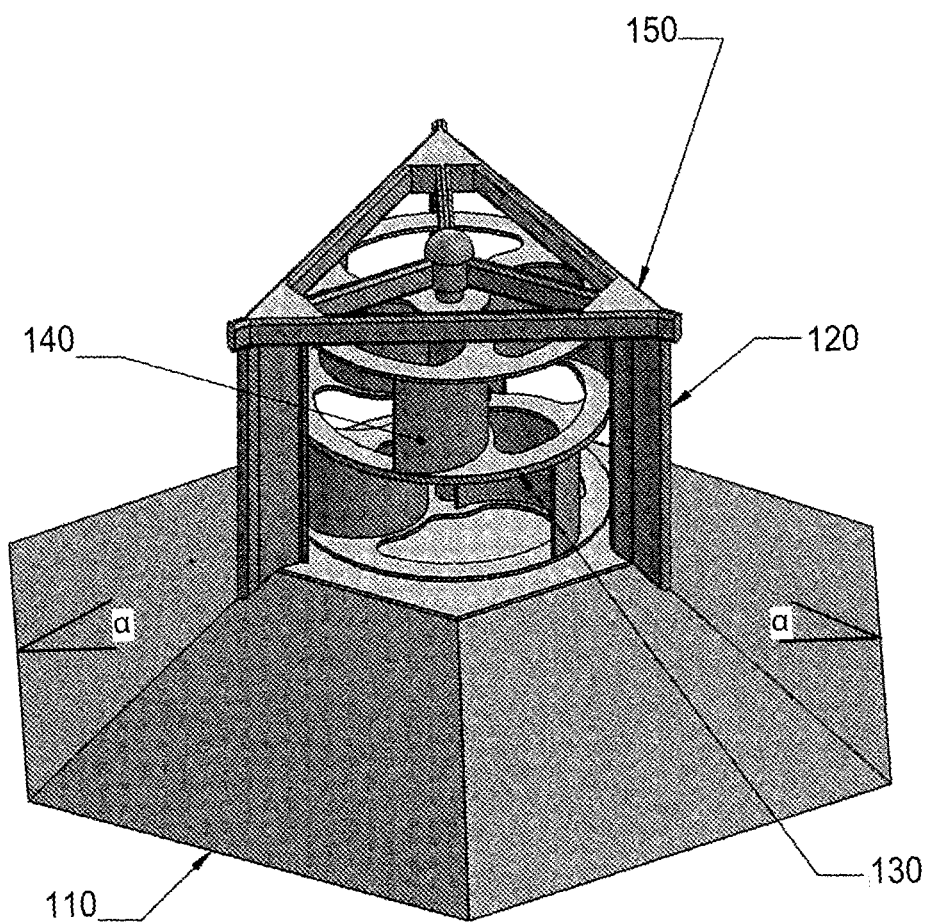
FIGS. 1A and 1B are perspective and top cross-sectional views, respectively, of a basic vertical axis wind turbine according to embodiments of the present disclosure.

Referring now to FIG. 1A, a basic vertical axis wind turbine is illustrated. As illustrated in FIG. 1A, vertical axis wind turbines according to the present disclosure comprise five parts: a stator skirt 110, at least one stator fin 120, at least one rotor plate 130, at least one rotor blade 140, and a top frame 150. Additional parts may be, but need not be, present to fall within the scope of the present disclosure. The rotor blades 140 turn a shaft and are attached to the rotor plates 130 at the top, the bottom, or both of the rotor blades 140. The stator skirt 110 supports the rotor plates 130 and, as illustrated in FIG. 1A, is rotationally symmetric and comprises trapezoidal panels, with each trapezoidal panel forming an angle with respect to a horizontal axis. Thus, the stator skirt 110 has a horizontal cross-section of a regular polygon with a number of sides equal to the number of trapezoidal panels. The stator fins 120 are attached at their bottoms to the stator skirt 110. Each stator fin 120 comprises a fin flip, which is disposed at an angle to the longitudinal axis of the stator fin 120 and is adapted to compress wind and direct the wind to the rotor blades 140 in a predetermined direction. The top frame 150 is attached to the tops of the stator fins 120 and is provided to maintain rigidity and structural integrity of the stator fins 120 and the vertical axis wind turbine as a whole.

Figure 1B:
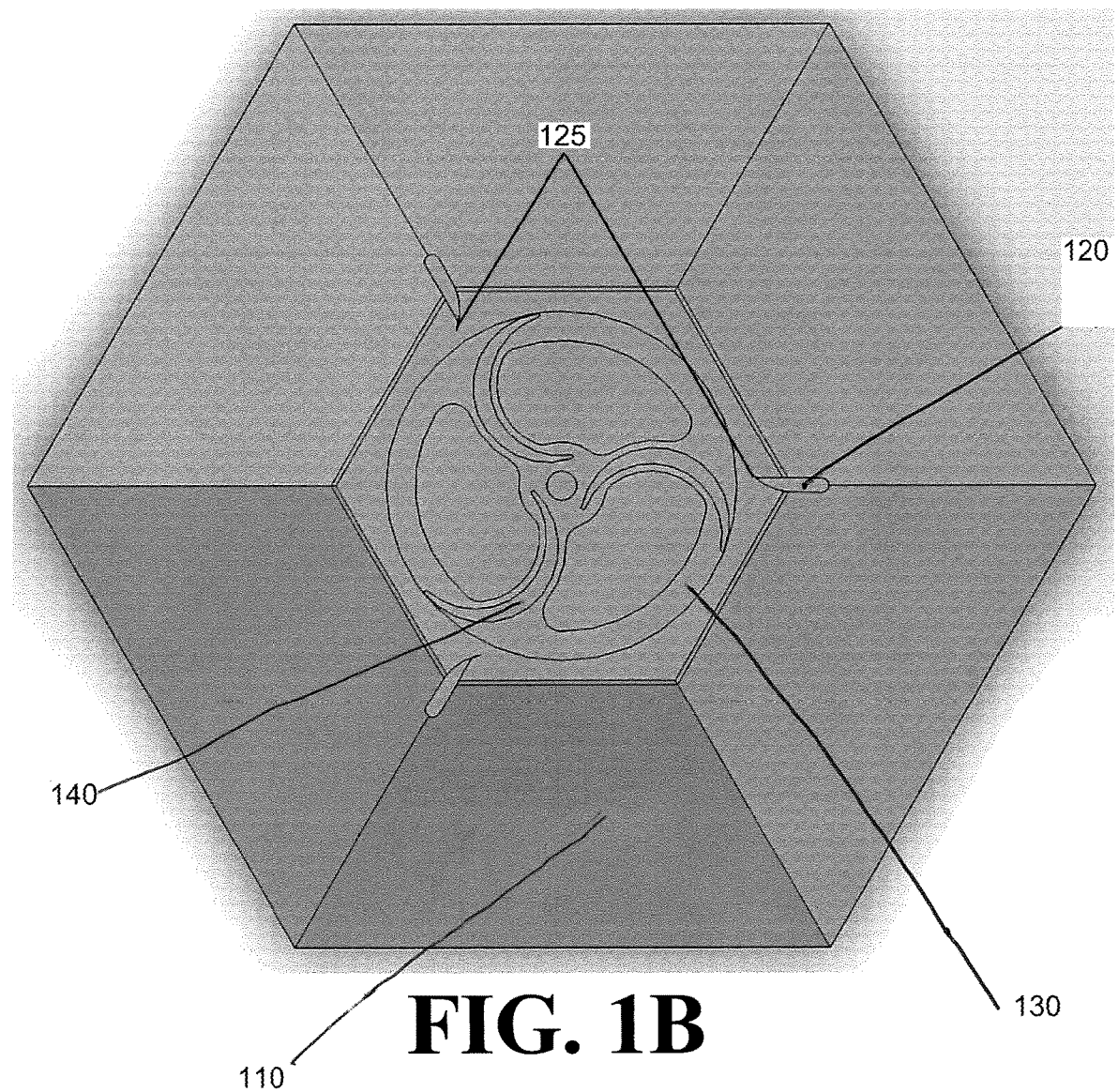

Referring now to FIG. 1B, various design features of the vertical axis wind turbine are illustrated. In this embodiment, three semielliptical crescent-shaped rotor blades 140 are provided, each forming an angle of 120° relative to each of the other rotor blades 140; those of ordinary skill in the art will understand that other numbers, arrangements, and shapes of rotor blades 140 may be suitable for particular applications. In this embodiment, three stator fins 120 spaced 120° apart are provided; those of ordinary skill in the art will understand that other numbers and arrangements of stator fins 120 may be suitable for particular applications. In this embodiment, each fin flip forms an angle of 45° relative to the longitudinal axis of the stator fin 120 and is two inches in length; those of ordinary skill in the art will understand that other angles and lengths of fin flips may be suitable for particular applications. In this embodiment, the stator skirt 110 comprises six trapezoidal panels and thus has a horizontal cross-section of a regular hexagon, with each trapezoidal panel forming an angle of 36° relative to a horizontal axis; those of ordinary skill in the art will understand that other numbers and angles of trapezoidal panels, and thus other shapes of stator skirt 110, may be suitable for particular applications.

Figure 2:
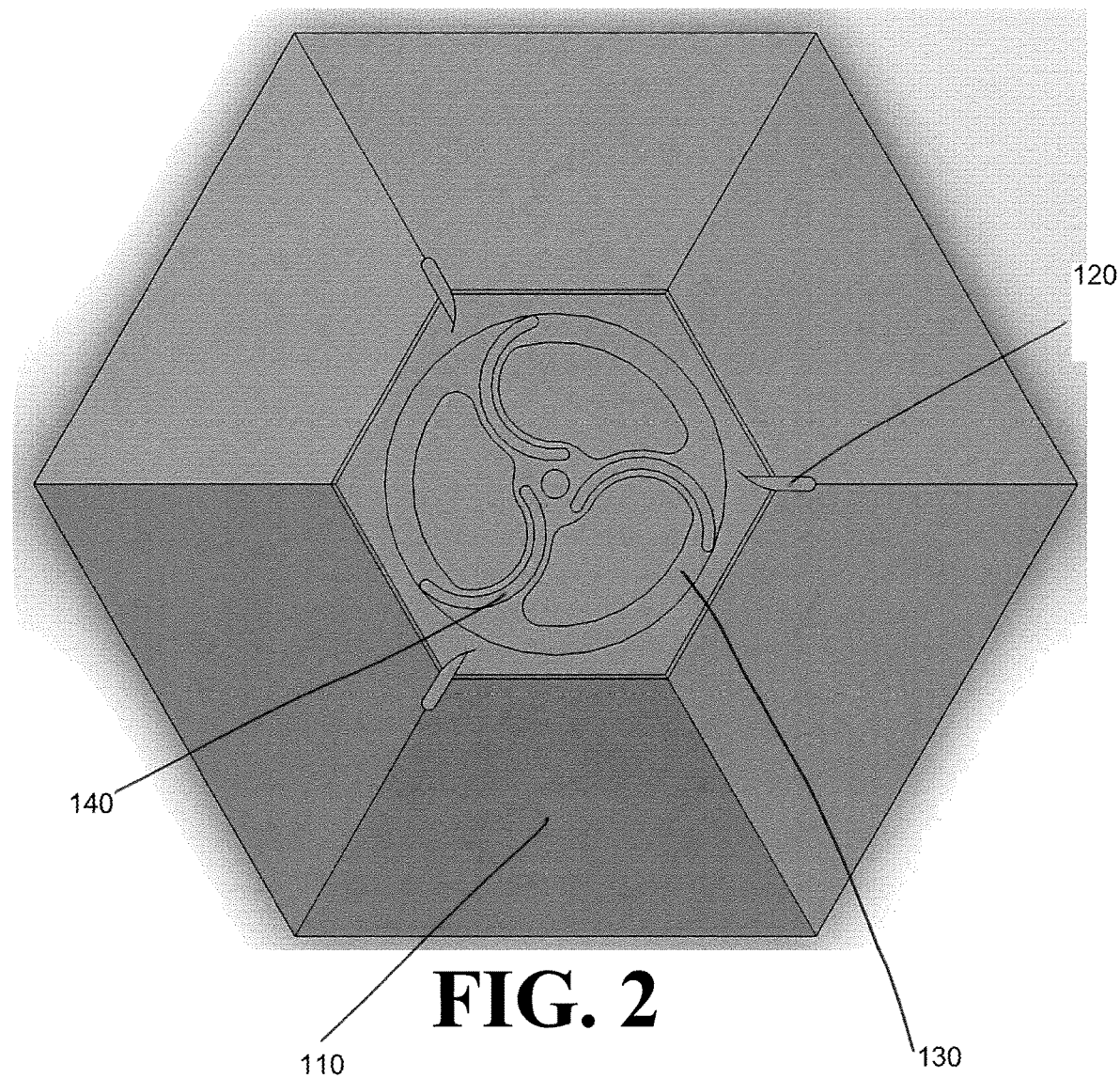
FIG. 2 is a top cross-sectional view of a vertical axis wind turbine having blades of constant cross-sectional width, according to embodiments of the present disclosure.

Referring now to FIG. 2, another embodiment of a vertical axis wind turbine is illustrated. This embodiment is similar to the embodiment illustrated in FIG. 1B, except that the rotor blades 140 have constant cross-sectional width, as opposed to the crescent-shaped blades 140 of FIG. 1B.

Figure 3:
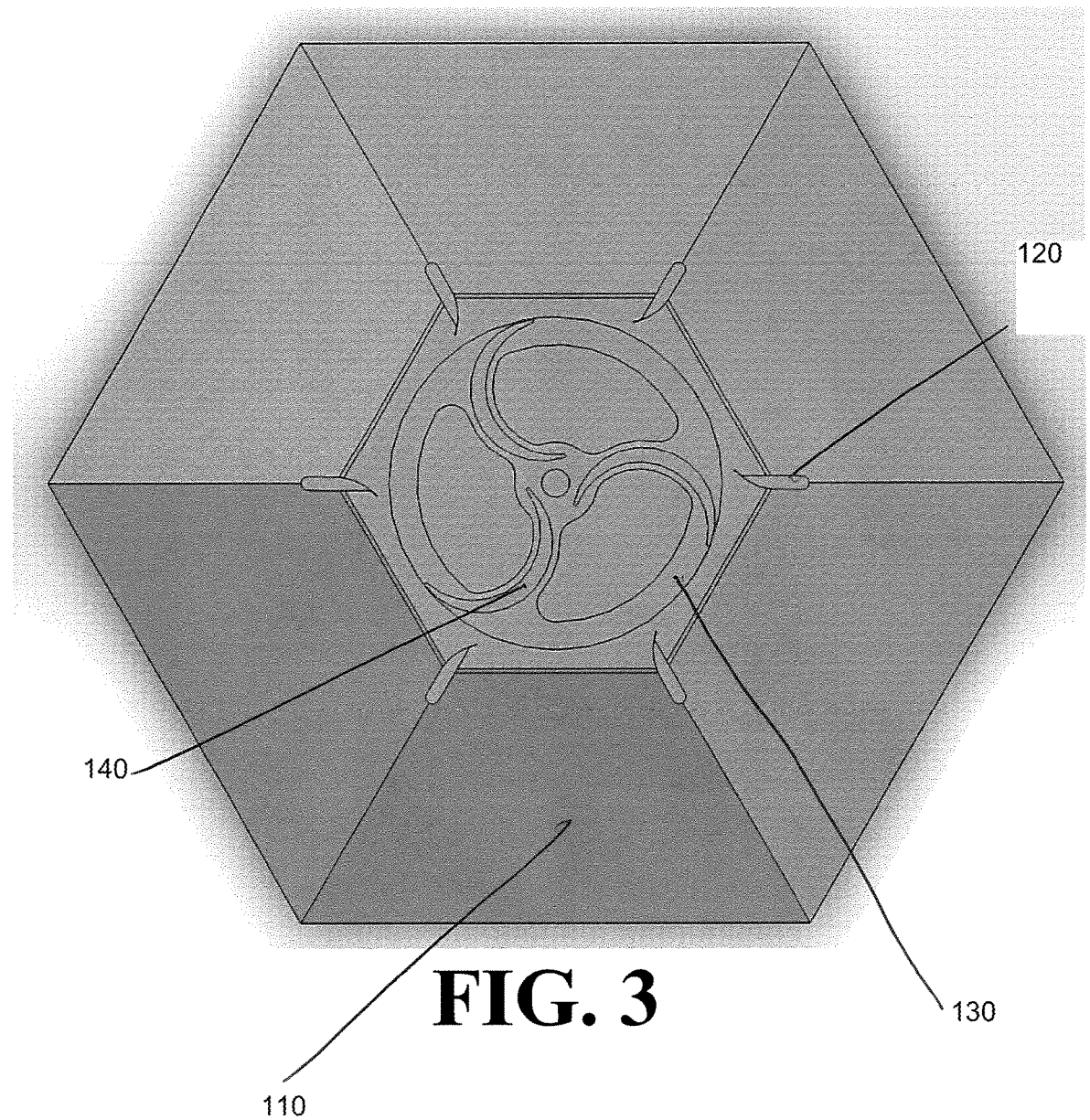
FIG. 3 is a top cross-sectional view of a vertical axis wind turbine having six stator fins, according to embodiments of the present disclosure.
Figure 4:
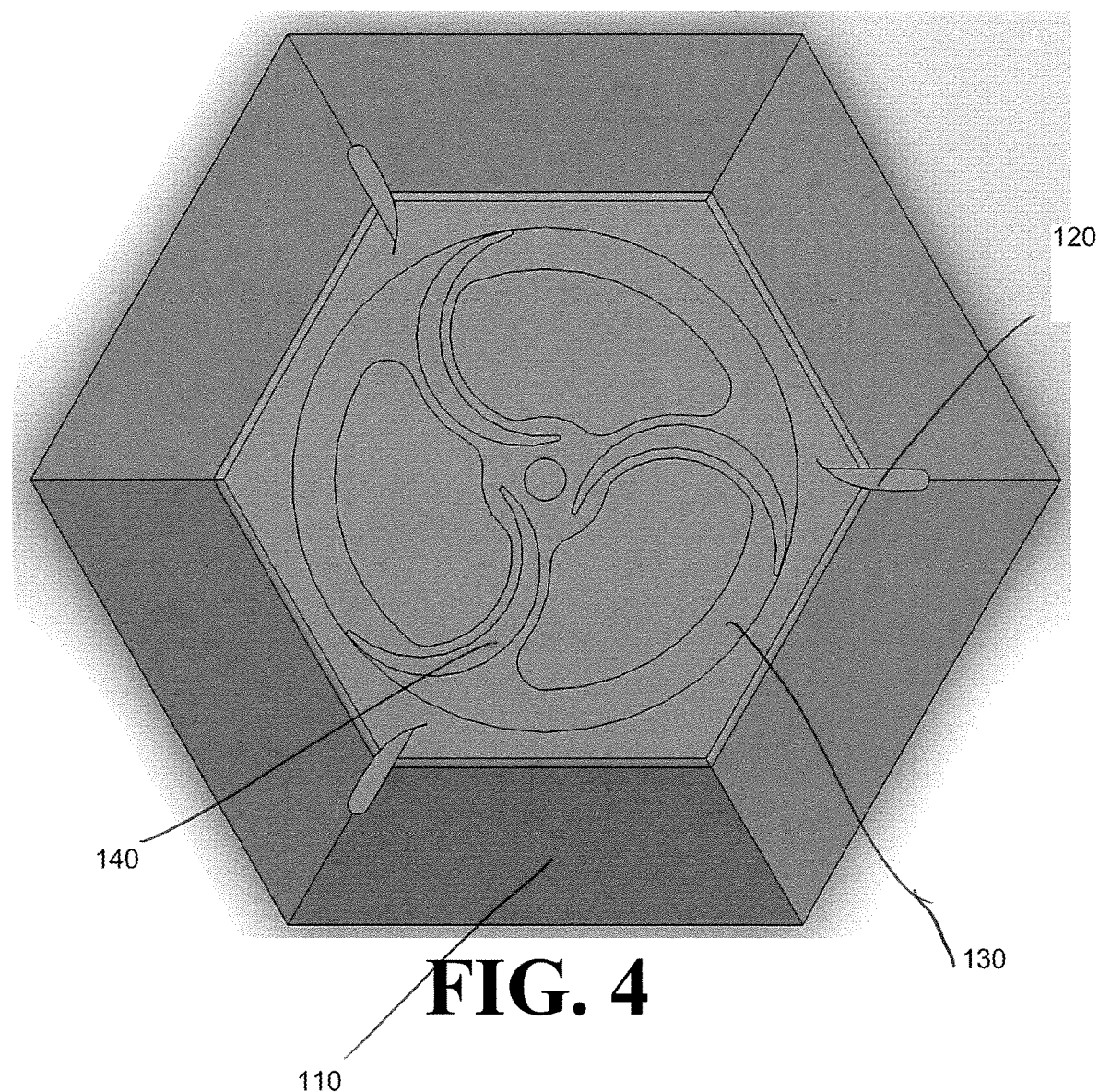
FIG. 4 is a top cross-sectional view of a vertical axis wind turbine having a stator skirt angle of 60°, according to embodiments of the present disclosure.

Referring now to FIG. 3, another embodiment of a vertical axis wind turbine is illustrated. This embodiment is similar to the embodiment illustrated in FIG. 1B, except that the turbine is provided with six stator fins 120, as opposed to the three stator fins 120 of FIG. 1B. Referring now to FIG. 4, another embodiment of a vertical axis wind turbine is illustrated.

This embodiment is similar to the embodiment illustrated in FIG. 1B, except that the trapezoidal panels of the stator skirt 110 form an angle of 60° relative to a horizontal axis, as opposed to the 36° angle of FIG. 1B.

Figure 5:
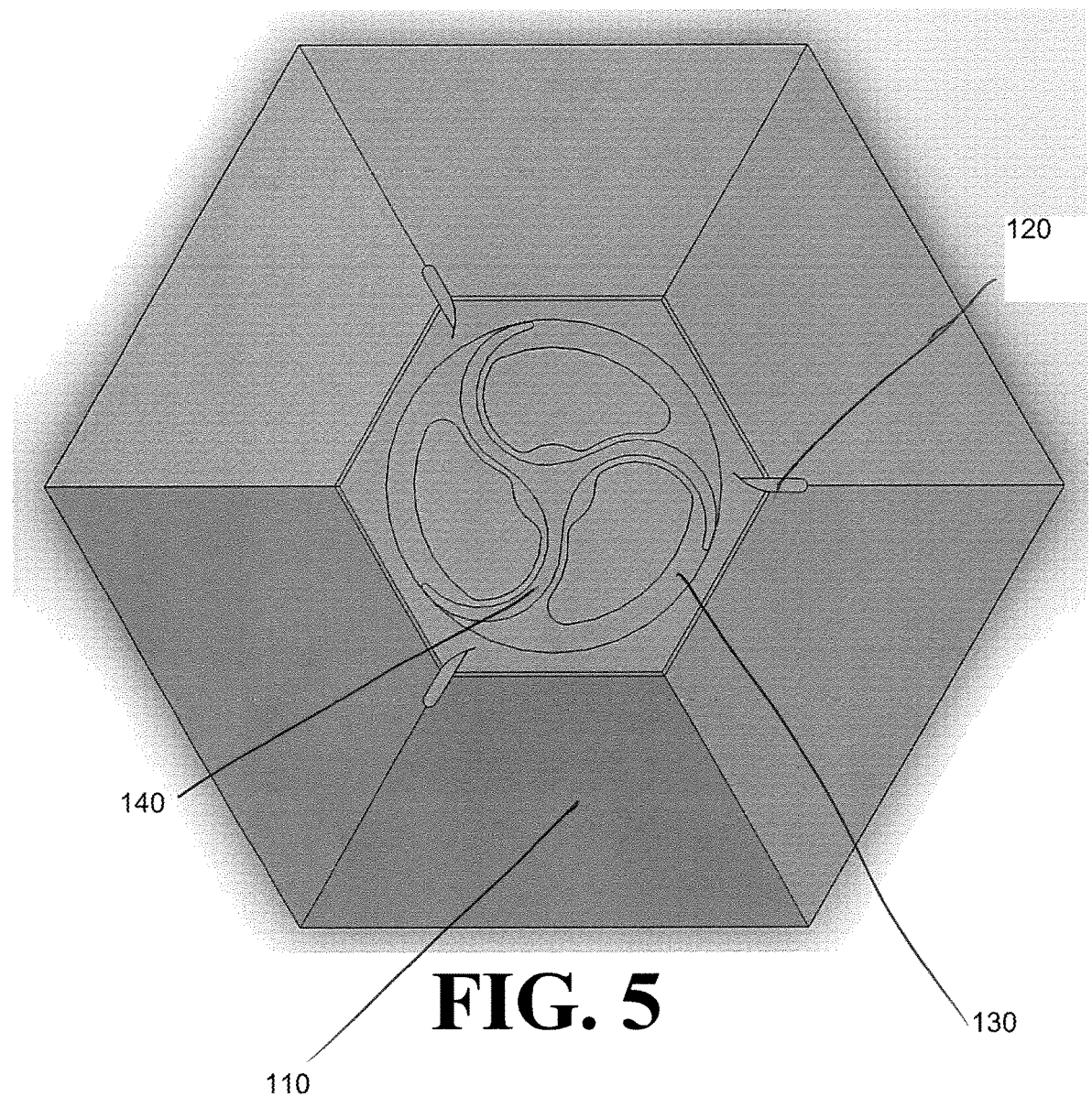
FIG. 5 is a top cross-sectional view of a vertical axis wind turbine having a unitary rotor, according to embodiments of the present disclosure.

Referring now to FIG. 5, another embodiment of a vertical axis wind turbine is illustrated. This embodiment is similar to the embodiment illustrated in FIG. 1B, except that the rotor blades 140 are interconnected to form a unitary rotor, as opposed to FIG. 1B, in which each rotor blade 140 is a separate component, attached to at least one rotor plate 130 but not to the other rotor blades 140.

Figure 6:
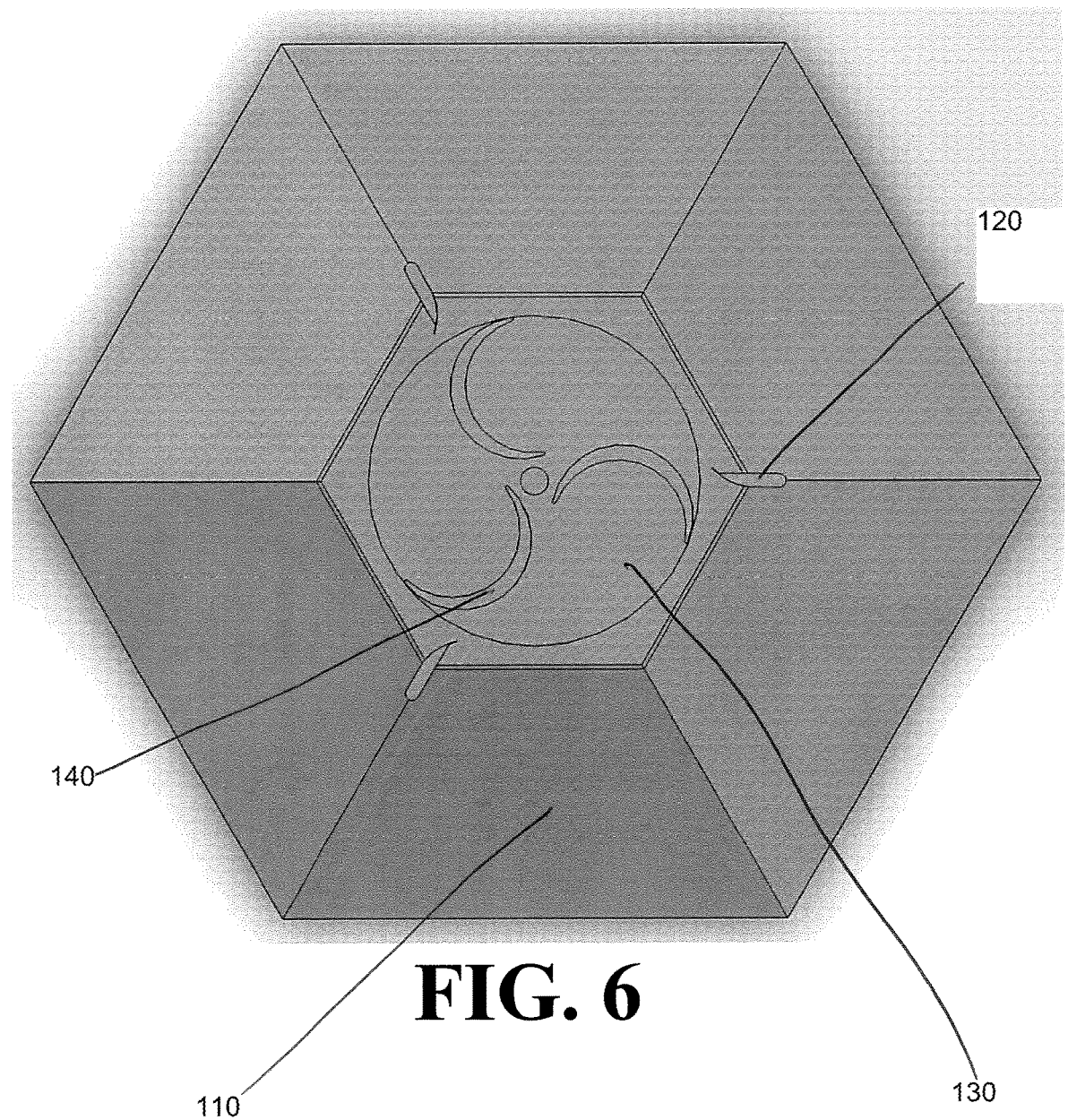
FIG. 6 is a top cross-sectional view of a vertical axis wind turbine having solid rotor plates devoid of holes or gaps, according to embodiments of the present disclosure.

Referring now to FIG. 6, another embodiment of a vertical axis wind turbine is illustrated. This embodiment is similar to the embodiment illustrated in FIG. 1B, except that the rotor plates 130 are solid and devoid of holes or gaps, as opposed to FIG. 1B, in which holes are present in the rotor plates 130.

Figure 7:
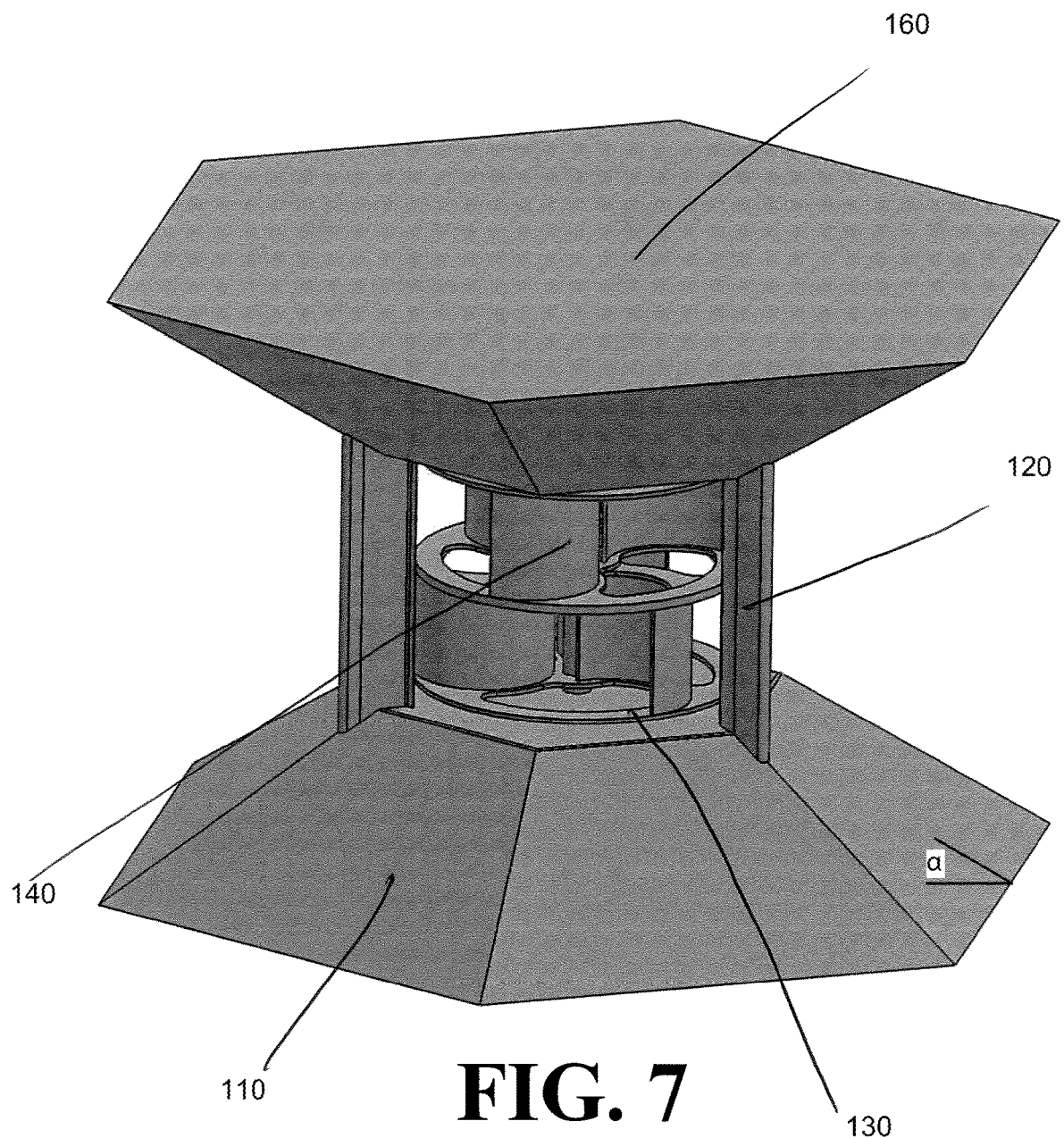
FIG. 7 is an isometric view of a vertical axis wind turbine having an amplifier skirt, according to embodiments of the present disclosure.

Referring now to FIG. 7, another embodiment of a vertical axis wind turbine is illustrated. This embodiment is similar to the embodiment illustrated in FIG. 1B, except that the turbine is provided with an amplifier skirt 160, disposed on top of the vertical axis wind turbine and attached to the top frame 150. As illustrated in FIG. 7, the amplifier skirt 160 may be, but need not be, a "mirror image" of the stator skirt 110. The amplifier skirt 160 captures and amplifies the wind and directs it into the uppermost of two sets of vertically stacked rotor blades 140.

Figure 8:
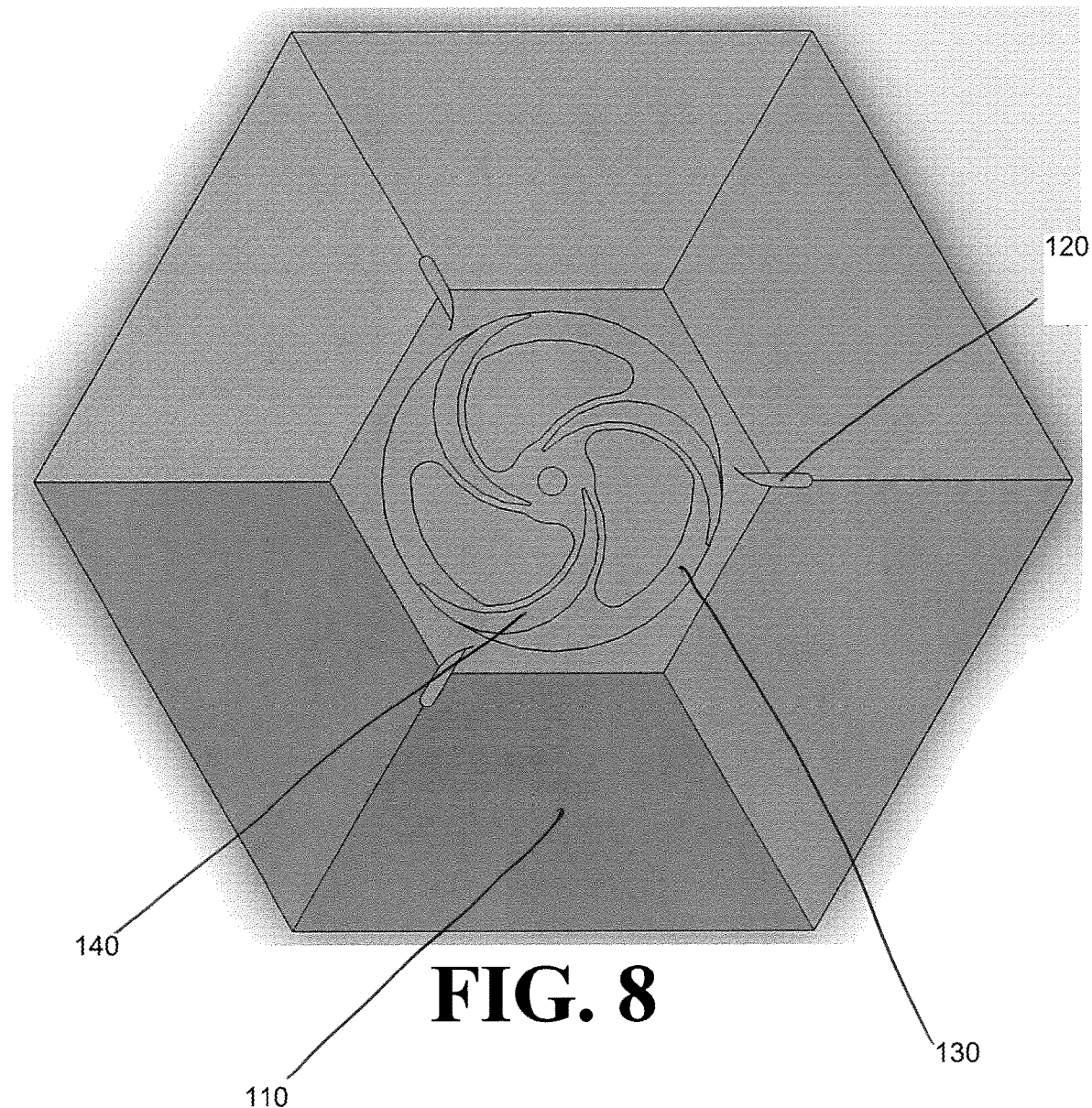
FIG. 8 is a top cross-sectional view of a vertical axis wind turbine having rotor blades with diameters larger than a radius of a rotor plate, according to embodiments of the present disclosure.

Referring now to FIG. 8, another embodiment of a vertical axis wind turbine is illustrated. This embodiment is similar to the embodiment illustrated in FIG. 1B, except that the rotor blades 140 have a diameter that is larger than a radius of the rotor plate 130, as opposed to the blades 140 of smaller diameter in FIG. 1B. Thus, in the embodiment illustrated in FIG. 8, the rotor blades 140 "overlap" near the shaft.

Figure 9A:
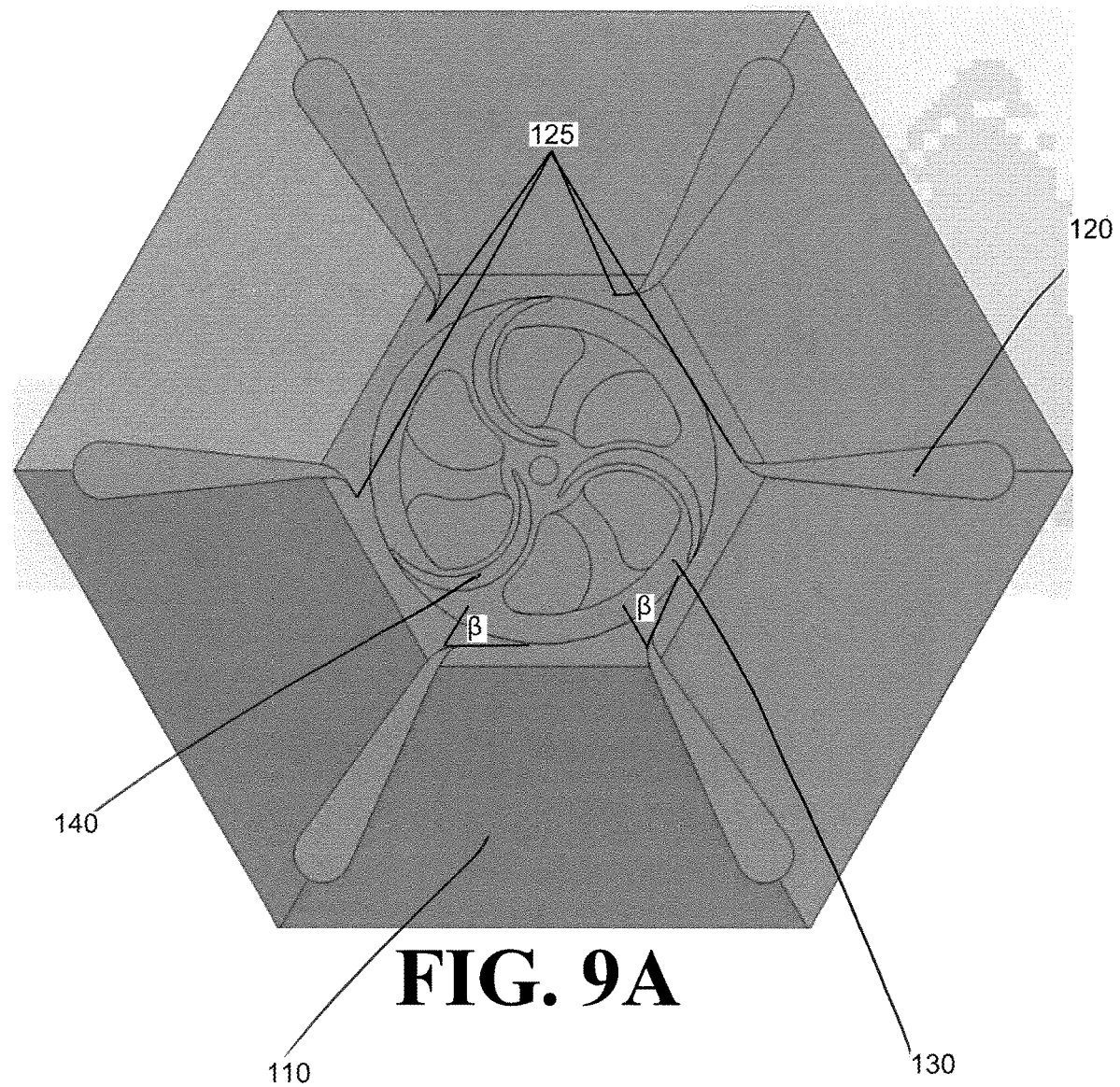
FIGS. 9A and 9B are top cross-sectional and isometric views, respectively, of a vertical axis wind turbine having an amplifier skirt and enlarged stator fins, according to embodiments of the present disclosure.
Figure 9B:
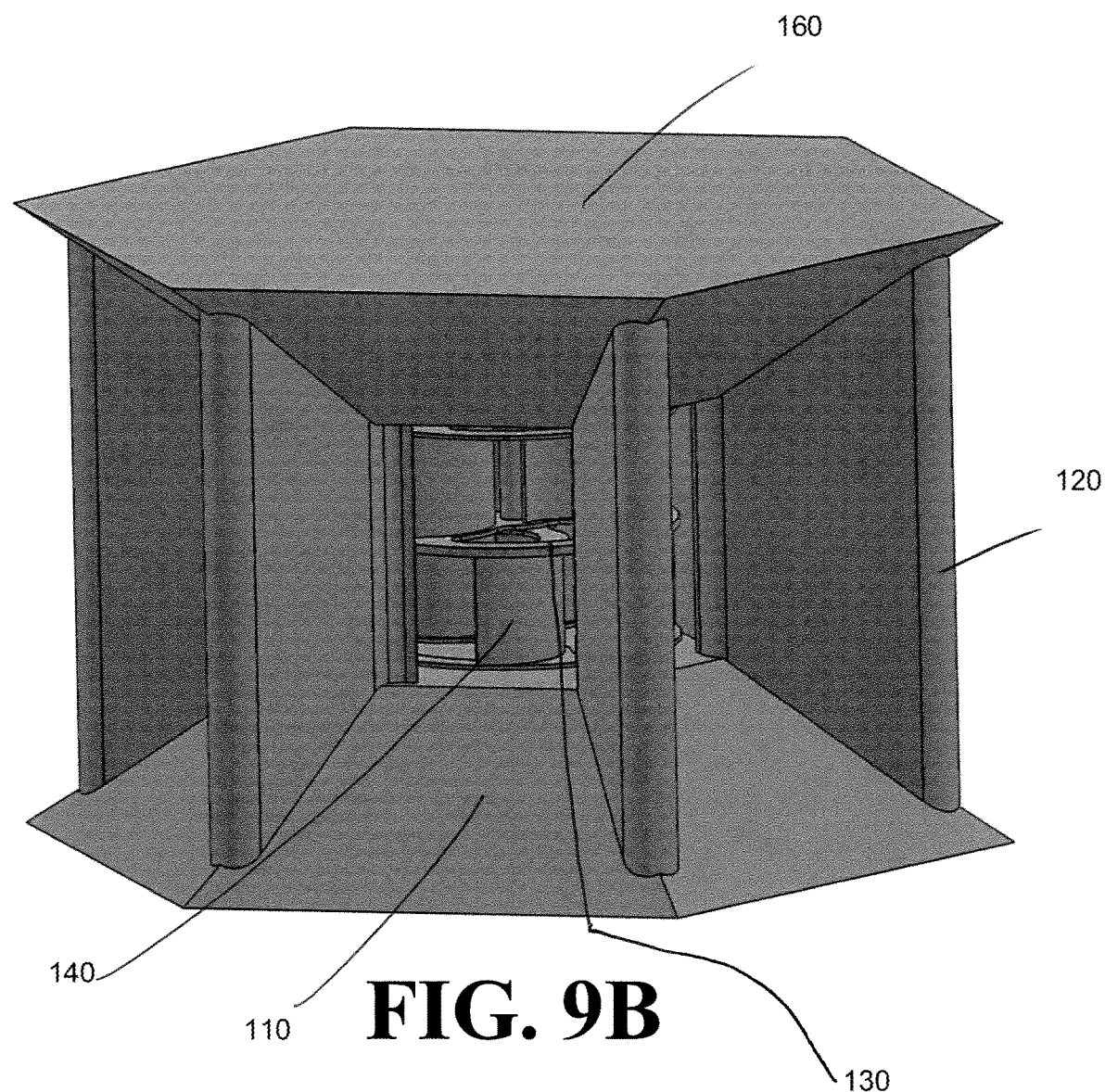

Referring now to FIG. 9A, another embodiment of a vertical axis wind turbine is illustrated. In this embodiment, the vertical axis wind turbine is provided with substantially enlarged stator fins 120 and fin flips, each stator fin 120 now having a longitudinal axis that runs most of the way from an outer edge of the rotor plate 130 to an outer edge of the stator skirt 110. The enlarged stator fins 120 and fin flips funnel and direct a significantly increased volume of incoming wind into the rotor blades 140 as compared to smaller stator fins 120, for example as illustrated in FIG. 1B. Referring now to FIG. 9B, an isometric view of the embodiment of FIG. 9A is illustrated. The embodiment also comprises an amplifier skirt 160 similar to that illustrated in FIG. 7, disposed on top of the vertical axis wind turbine and attached to the top frame 150. As illustrated in FIG. 9B, the amplifier skirt 160 may be, but need not be, a "mirror image" of the stator skirt 110. The amplifier skirt 160 captures and amplifies the wind and directs it into the rotor blades 140.

The angle α between a horizontal axis and the surface of the stator skirt 110 and/or amplifier skirt 160 may be selected to provide a desired wind shaping profile. By way of first non-limiting example, the angle α may be less than about 90°, less than about 85°, less than about 80°, less than about 75°, less than about 70°, less than about 65°, less than about 60°, less than about 55°, less than about 50°, less than about 45°, less than about 40°, less than about 35°, less than about 30°, less than about 25°, less than about 20°, less than about 15°, less than about 10°, or less than about 5°, or alternatively less than about any whole number of degrees between about 1 and about 90. By way of second non-limiting example, the angle α may be more than about 0°, more than about 5°, more than about 10°, more than about 15°, more than about 20°, more than about 25°, more than about 30°, more than about 35°, more than about 40°, more than about 45°, more than about 50°, more than about 55°, more than about 60°, more than about 65°, more than about 70°, more than about 75°, more than about 80°, or more than about 85°, or alternatively more than about any whole number of degrees between about 0 and about 89. It is to be expressly understood that the angle α of the stator skirt 110 and the angle α of the amplifier skirt 160 may be the same or different.

Figure 10A:
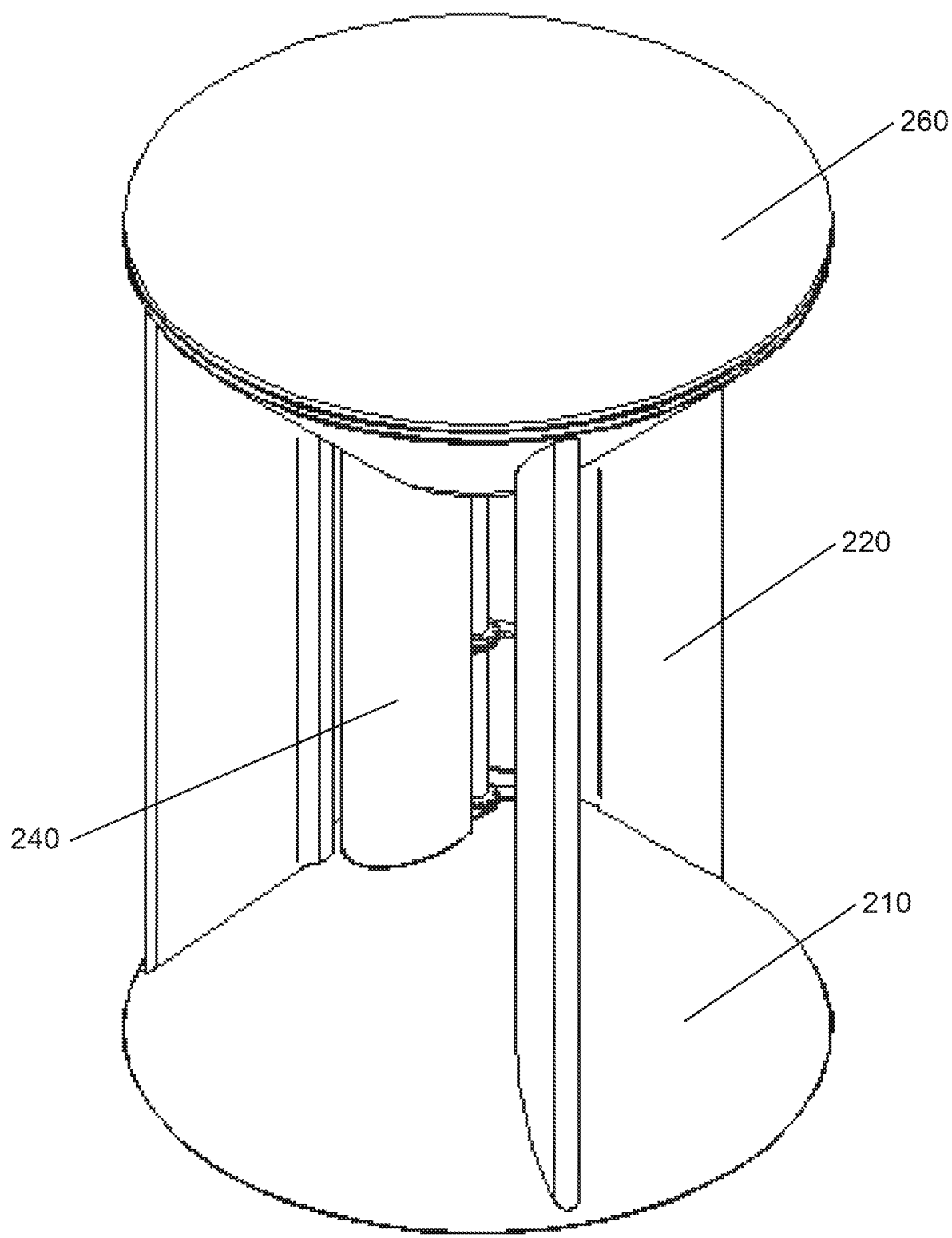
FIGS. 10A, 10B, and 10C are isometric, front, and top cross-sectional views, respectively, of a vertical axis wind turbine having parabolic stator and amplifier skirts, according to embodiments of the present disclosure.
Figure 10B:
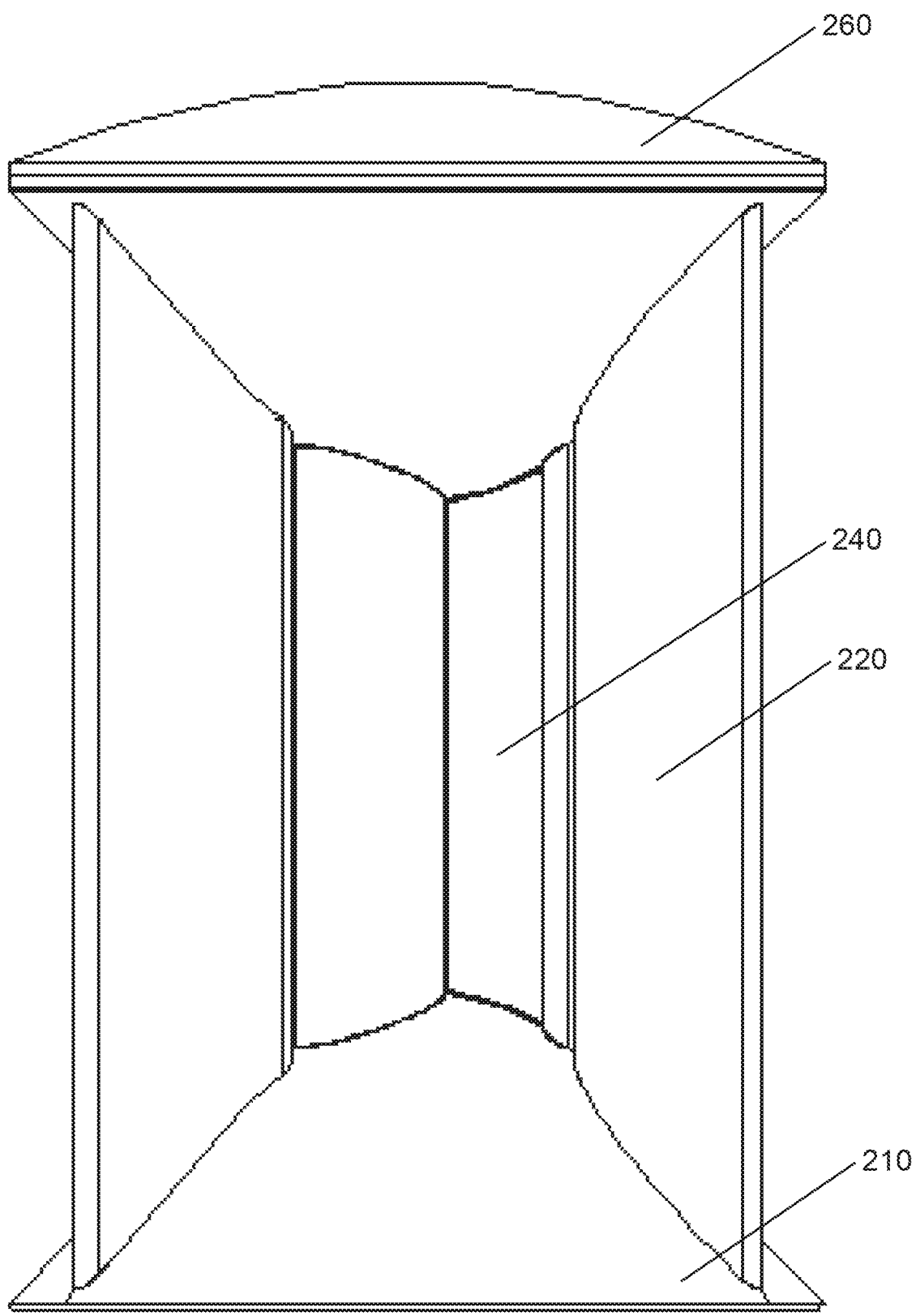

Referring now to FIGS. 10A and 10B, another embodiment of a vertical axis wind turbine is illustrated. As illustrated in FIGS. 10A and 10B, vertical axis wind turbines according to the present disclosure comprise at least three parts: a stator skirt 210, at least one stator fin 220, and at least one rotor blade 240. Additional parts, such as a rotor plate (not illustrated), may be, but need not be, present to fall within the scope of the present disclosure. The rotor blades 240 turn a shaft, and may in some embodiments be attached to rotor plates (if present) at the top, the bottom, or both of the rotor blades 240. The stator skirt 210, as illustrated in FIGS. 10A and 10B, is rotationally symmetric and comprises a paraboloid, typically an elliptical paraboloid, such that at least a portion of a wind-facing surface of the stator skirt 210 has a generally parabolic shape. The stator skirt 210 also comprises a substantially planar base for stability when placed on the ground or another horizontal support. In some embodiments, as illustrated in FIGS. 10A and 10B, the surface of the stator skirt 210 may comprise two portions: an approximately conical lower portion (i.e. where the slope of the surface relative to a horizontal axis is approximately constant) and an approximately parabolic upper portion (i.e. where the slope of the surface relative to a horizontal axis generally decreases with increasing vertical distance from the substantially planar base, and may, but need not, be approximately zero at an apex or vertex of the stator skirt 210). Importantly, the stator skirt 210 typically has a horizontal cross-section not of a polygon but rather of an ellipse, and in many embodiments a circle. The stator fins 220 are attached at their bottoms to the stator skirt 210. Each stator fin 220 comprises a fin flip, which is disposed at an angle to the longitudinal axis of the stator fin 220 and is adapted to compress wind and direct the wind to the rotor blades 240 in a predetermined direction. In some embodiments, a top frame (not illustrated) may be provided, and may be attached to the tops of the stator fins 220 to maintain rigidity and structural integrity of the stator fins 220 and the vertical axis wind turbine as a whole.

As illustrated in FIGS. 10A and 10B, the vertical axis wind turbine also comprises an amplifier skirt 260, disposed on top of the vertical axis wind turbine and attached to the tops of stator fins 220 (or, in some embodiments, a top frame to which the stator fins 220 may in turn be attached). The amplifier skirt 260 captures and amplifies the wind and directs it into the rotor blades 240.

As further illustrated in FIGS. 10A and 10B, the amplifier skirt 260 may be, but need not, be a "mirror image" of the stator skirt 210. The amplifier skirt 260 generally, like the stator skirt 210, is rotationally symmetric and comprises a paraboloid, typically an elliptical paraboloid, in which at least a portion of a wind-facing surface of the amplifier skirt 260 has a generally parabolic shape, extending downwardly from a top portion to form an angle with respect to a horizontal axis. In some embodiments, as illustrated in FIGS. 10A and 10B, the surface of the amplifier skirt 260 may comprise at least two portions: an approximately conical upper portion (i.e. where the slope of the surface relative to a horizontal axis is approximately constant) and an approximately parabolic lower portion (i.e. where the slope of the surface relative to a horizontal axis generally decreases with increasing vertical distance from the approximately conical portion, and may, but need not, be approximately zero at an apex or vertex of the amplifier skirt 260). Unlike the stator skirt 210, whose base must generally be substantially planar for stability, the amplifier skirt 260 may additionally have a curved, arcuate, or parabolic top portion, as illustrated in FIGS. 10A and 10B; however, in some applications (e.g. where it is intended to vertically stack multiple vertical axis wind turbines, one atop another), it may be desirable for the amplifier skirt 260 to have a substantially planar top portion.

Figure 10C:
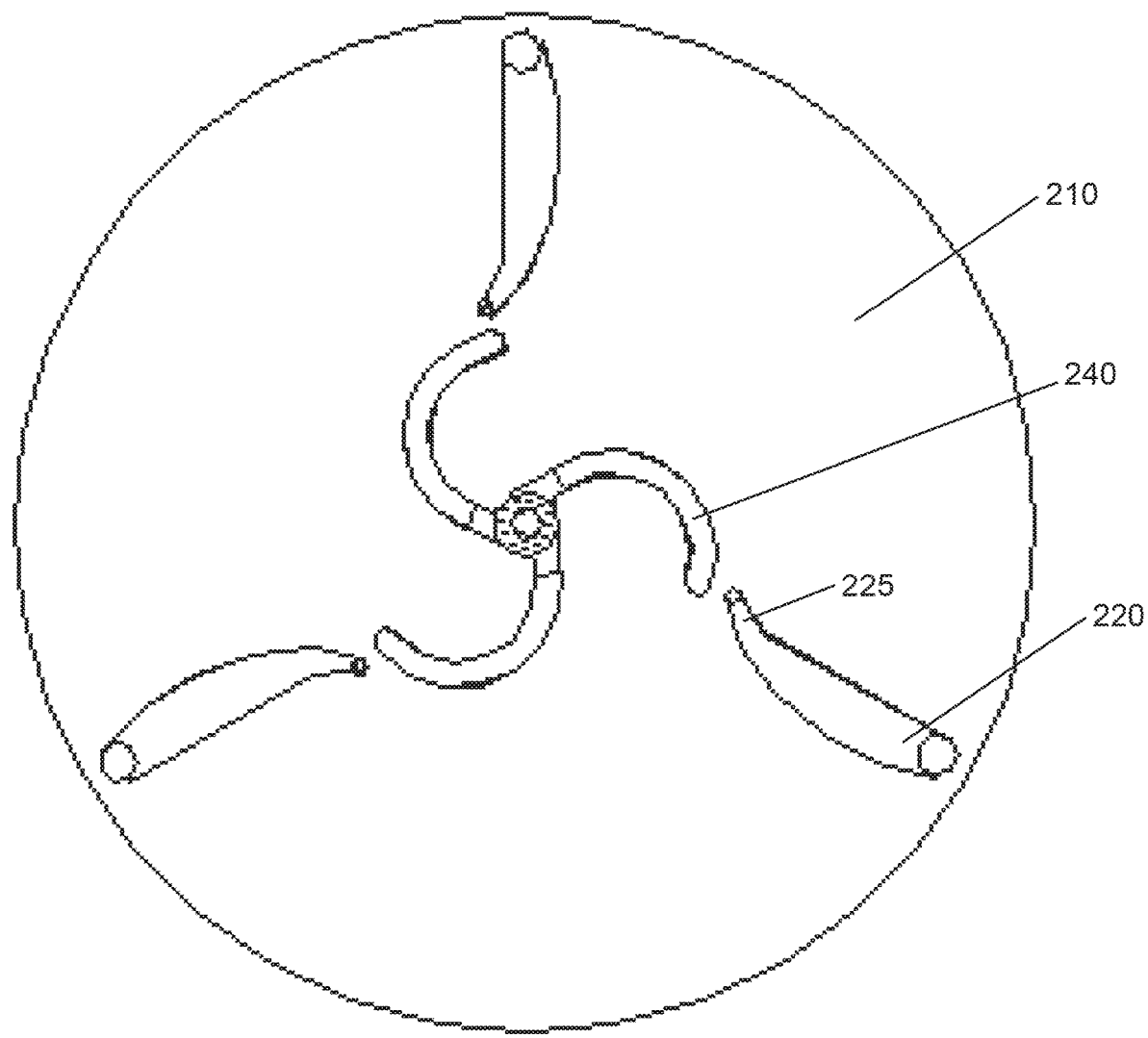

Referring now to FIG. 10C, various design features of the vertical axis wind turbine are illustrated. In this embodiment, three arcuate rotor blades 240 are provided, each forming an angle of about 120° relative to each of the other rotor blades 240; those of ordinary skill in the art will understand that other numbers, arrangements, and shapes of rotor blades 240 may be suitable for particular applications. In this embodiment, three stator fins 220 spaced about 120° apart are provided; those of ordinary skill in the art will understand that other numbers and arrangements of stator fins 220 may be suitable for particular applications. In this embodiment, each fin flip 225 forms an angle of about 45° relative to the longitudinal axis of the stator fin 220; those of ordinary skill in the art will understand that other angles and lengths of fin flips may be suitable for particular applications. In this embodiment, the stator skirt 210 comprises a circular paraboloid, i.e. has a circular horizontal cross-section; those of ordinary skill in the art will understand that other shapes, most typically elliptical shapes, of the horizontal cross-section of the stator skirt 210 may be suitable for particular applications.

The angle α between a horizontal axis and the surface of the stator skirt 210 and/or amplifier skirt 260, as measured by an average or at any point of the stator skirt 210 and/or the top of the amplifier skirt 260, may be selected to provide a desired wind shaping profile. By way of first non-limiting example, the angle α may be less than about 90°, less than about 85°, less than about 80°, less than about 75°, less than about 70°, less than about 65°, less than about 60°, less than about 55°, less than about 50°, less than about 45°, less than about 40°, less than about 35°, less than about 30°, less than about 25°, less than about 20°, less than about 15°, less than about 10°, or less than about 5°, or alternatively less than about any whole number of degrees between about 1 and about 90. By way of second non-limiting example, the angle α may be more than about 0°, more than about 5°, more than about 10°, more than about 15°, more than about 20°, more than about 25°, more than about 30°, more than about 35°, more than about 40°, more than about 45°, more than about 50°, more than about 55°, more than about 60°, more than about 65°, more than about 70°, more than about 75°, more than about 80°, or more than about 85°, or alternatively more than about any whole number of degrees between about 0 and about 89. As described above, the shape of the surface of the stator skirt 210 and/or amplifier skirt 260 may be entirely parabolic (i.e. the angle α decreases continuously from the base of the stator skirt 210 and/or top of the amplifier skirt 260, e.g. to about zero at an apex or vertex of the stator skirt 210 and/or amplifier skirt 260), or may comprise both a parabolic portion and a conical portion (i.e. the angle α is substantially constant). It is to be expressly understood that the angle α of the stator skirt 210 and the angle α of the amplifier skirt 260 may be the same or different.

One advantage of the present invention lies in its usefulness to shape the arcuate rotor blades 240 to correspond to, interface with, and/or match the shape of the stator skirt 210 and/or amplifier skirt 260 to provide a desired airflow pattern. By way of first non-limiting example, a center or terminal point of one or more rotor blades 240, when the rotor blade 240 is in a selected rotational position, may coincide with a center of curvature of the stator skirt 210 and/or amplifier skirt 260 or a portion thereof. By way of second non-limiting example, a radius of curvature of one or more rotor blades 240 may be the same as, or have a selected ratio to, a radius of curvature of the stator skirt 210 and/or amplifier skirt 260 or a portion thereof.

In some embodiments, vertical axis wind turbines of the present invention may include rotor blades 240 that are modular, i.e. that can be individually repaired or replaced without disassembly or modification of other rotor blades 240 or any other part of the vertical axis wind turbine. Particularly, in the practice of the present invention, it may be possible to add, remove, or replace one or more rotor blades 240 without disturbing the other rotor blades 240, thus reducing downtime of the turbine as a whole, and potentially even allowing the turbine to operate with less than a full complement of rotor blades 240 while one or more of the blades are replaced, repaired, and/or refurbished. The modularity of rotor blades 240 may also make assembly less time-consuming and challenging, and/or may allow for the ability to adapt the turbine to a particular environment of use or modify the wind turbine after initial installation.

Another advantage of the present invention is that, unlike many vertical axis wind turbines of the prior art, a ratio of the turbine's height to its diameter or width may be kept relatively low.

A low height-to-width ratio provides several advantages, including but not limited to improved performance and improved ability to stack turbines atop each other. By way of non-limiting example, height-to-width ratios of turbines of the present invention may be less than about 3.0, less than about 2.9, less than about 2.8, less than about 2.7, less than about 2.6, less than about 2.5, less than about 2.4, less than about 2.3, less than about 2.2, less than about 2.1, less than about 2.0, less than about 1.9, less than about 1.8, less than about 1.7, less than about 1.6, less than about 1.5, less than about 1.4, less than about 1.3, less than about 1.2, less than about 1.1, less than about 1.0, less than about 0.9, less than about 0.8, less than about 0.7, less than about 0.6, less than about 0.5, less than about 0.4, less than about 0.3, less than about 0.2, or less than about 0.1, or alternatively may fall within a range of at least about any tenth of a whole number between about 0.1 and about 3.0 and no more than about any other tenth of a whole number between about 0.1 and about 3.0.

Another advantage of the present invention is that, unlike many vertical axis wind turbines of the prior art, the embodiment illustrated in FIGS. 10A through 10C presents no corners or sharp edges in the path of oncoming wind. Instead, all wind-facing surfaces of the turbine of FIGS. 10A through 10C are arcuate, parabolic, or otherwise free of sharp angles. This feature of the present invention may provide several important benefits. By way of first non-limiting example, corners or sharp edges in the path of air into the turbine may impede the flow of air to the rotor blades 240, create discontinuities or other undesirable effects in the pattern of air flow, or otherwise diminish the effectiveness of the turbine in efficiently capturing wind energy; by providing wind-facing surfaces free of sharp angles, the embodiment illustrated in FIGS. 10A through 10C may thus have an improved airflow pattern and/or improved efficiency. By way of second non-limiting example, stresses or other forces exerted on the turbine by incoming air may be exacerbated by and/or focused upon corners or sharp edges, thus making the turbine more susceptible to mechanical damage or failure at or near such corners or sharp edges; by providing wind-facing surfaces free of sharp angles, the embodiment illustrated in FIGS. 10A through 10C may thus have improved structural integrity and/or an extended useful life.

Another advantage of the present invention is that, due to the improved mechanical resilience and structural integrity of the vertical axis wind turbine and its components, lighter materials, i.e. materials having a lower density and/or a higher strength-to-weight ratio, may be used to construct any one or more of the stator skirt 110/210, the stator fins 120/220, the rotor plate 130, the rotor blades 140/240, the top frame 150, the amplifier skirt 160/260, and/or any other parts or components of the vertical axis wind turbine. By way of non-limiting example, any one or more of these and/or other components may comprise a material selected from the group consisting of fiberglass, lightweight wood (e.g. balsa wood), aluminum, and a solid foam.

Figure 11A:
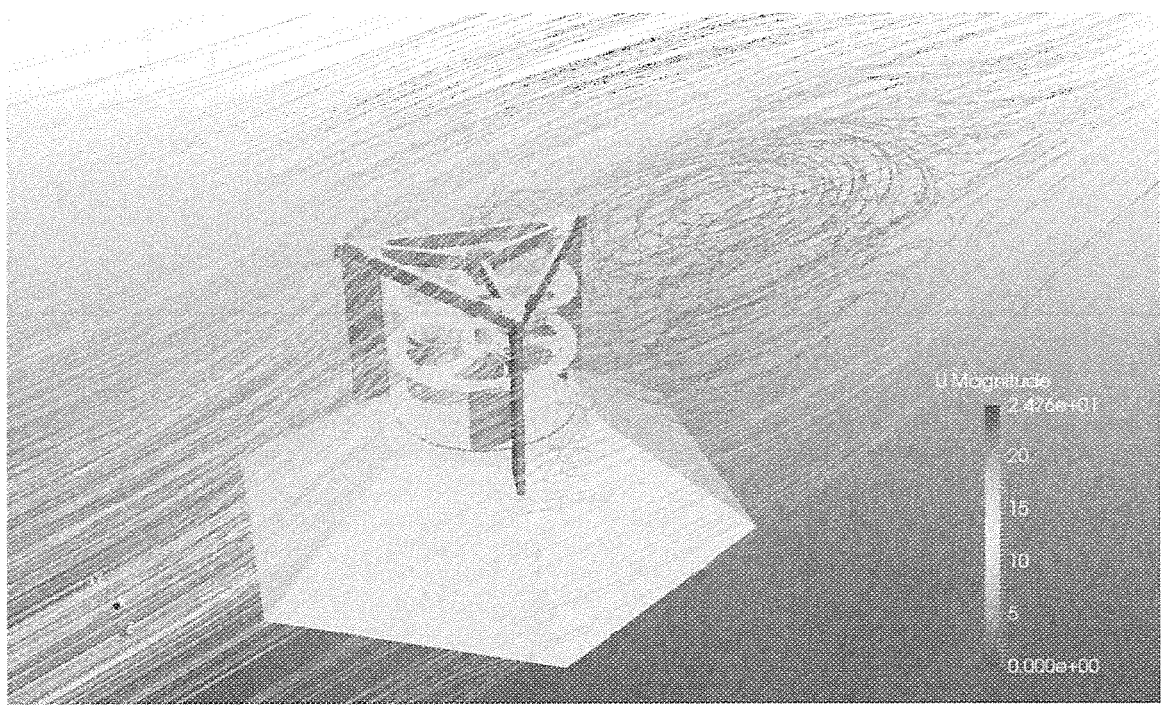
FIGS. 11A and 11B are each computer-generated views of air flow through the vertical axis wind turbine illustrated in FIGS. 1A and 1B.
Figure 11B:
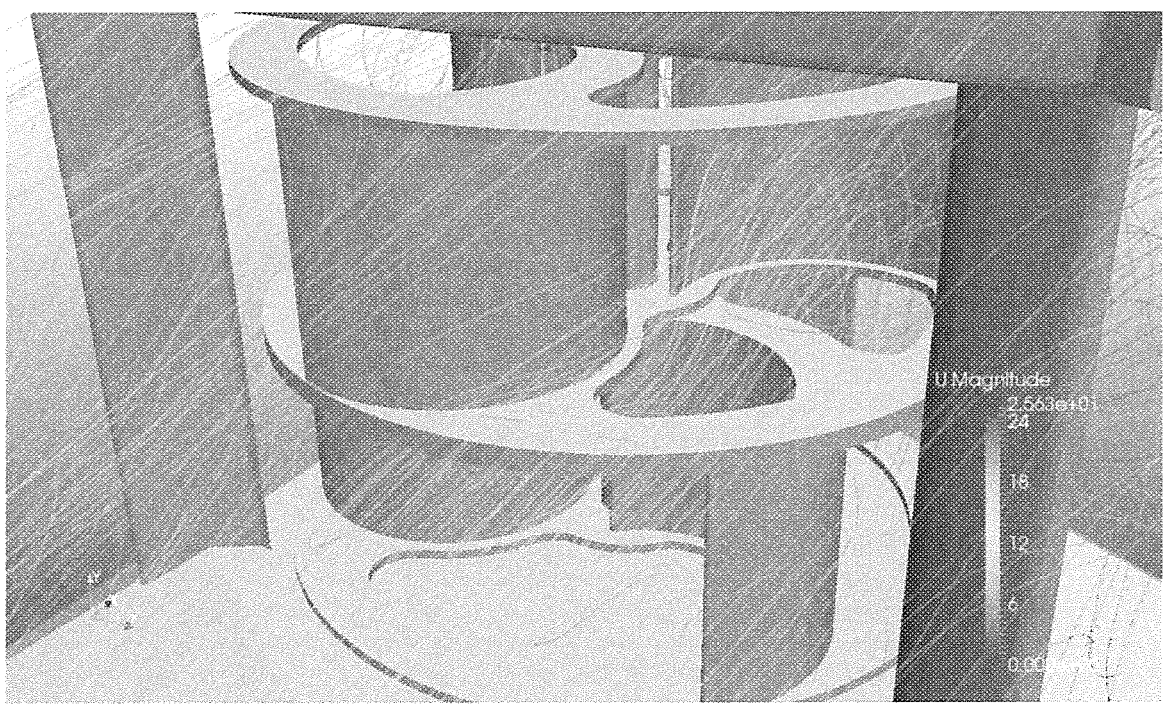

Referring now to FIGS. 11A and 11B, air flow through the embodiment of FIGS. 1A and 1B is illustrated.

Figure 12A:
FIGS. 12A, 12B, and 12C are each computer-generated views of air flow through the vertical axis wind turbine illustrated in FIG. 7.
Figure 12B:
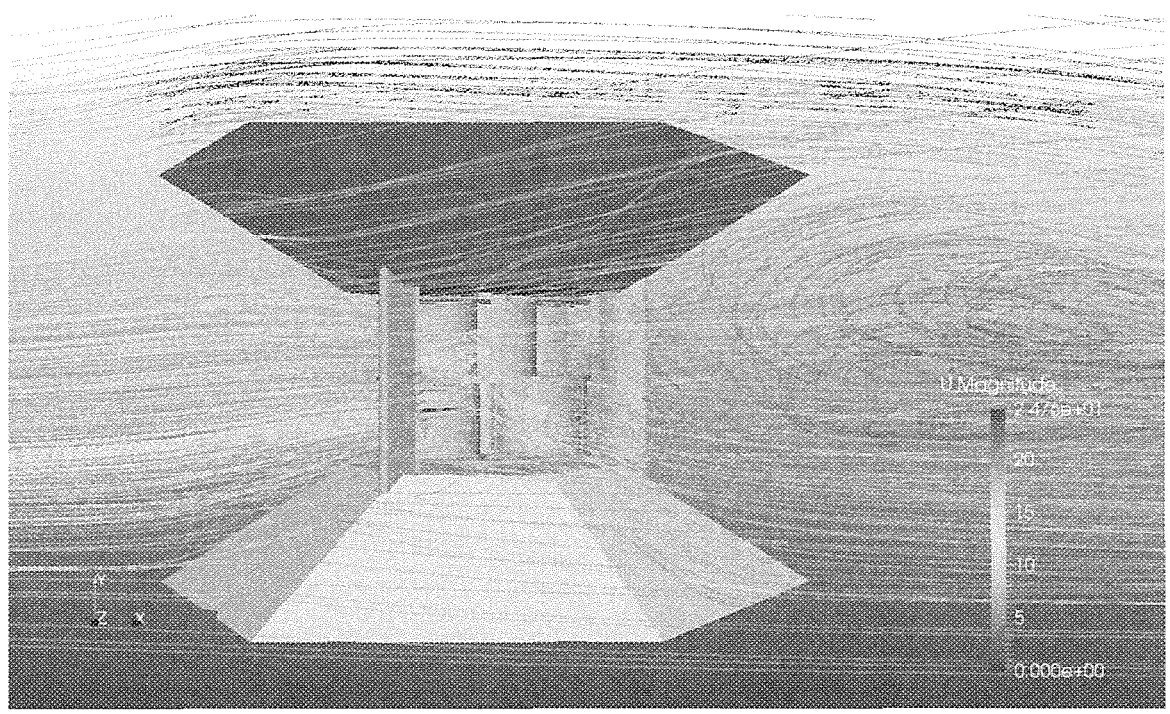
Figure 12C:
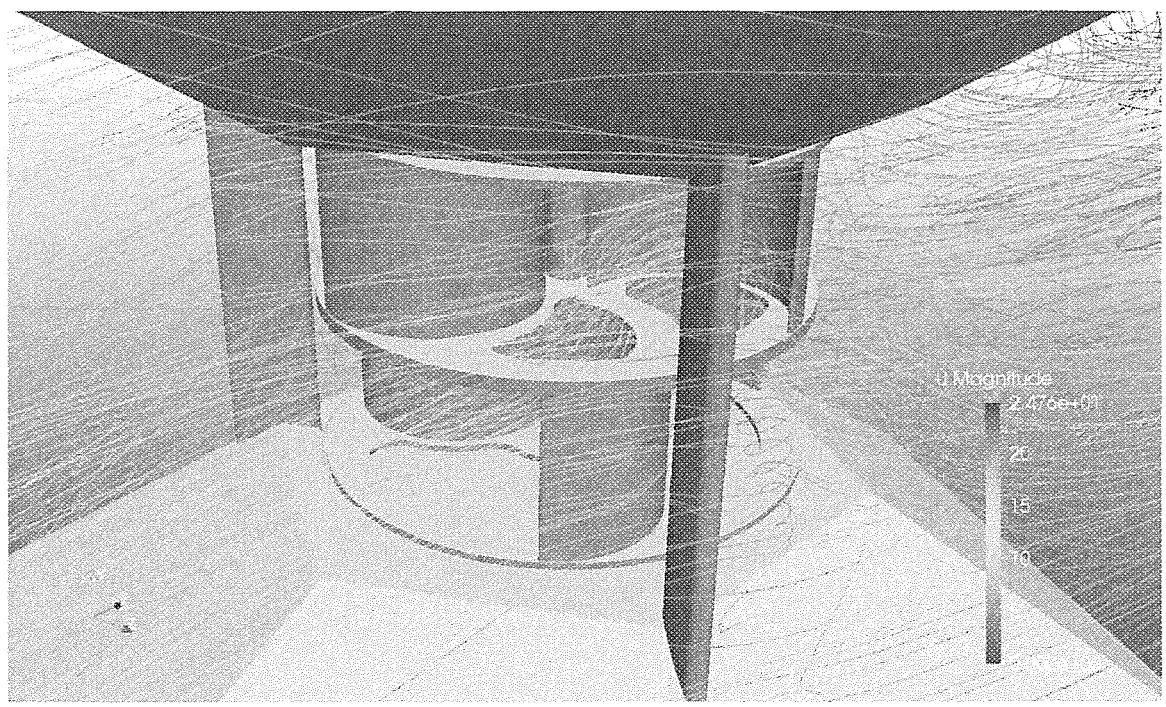

Referring now to FIGS. 12A, 12B, and 12C, air flow through the embodiment of FIG. 7 is illustrated.

Figure 13A:
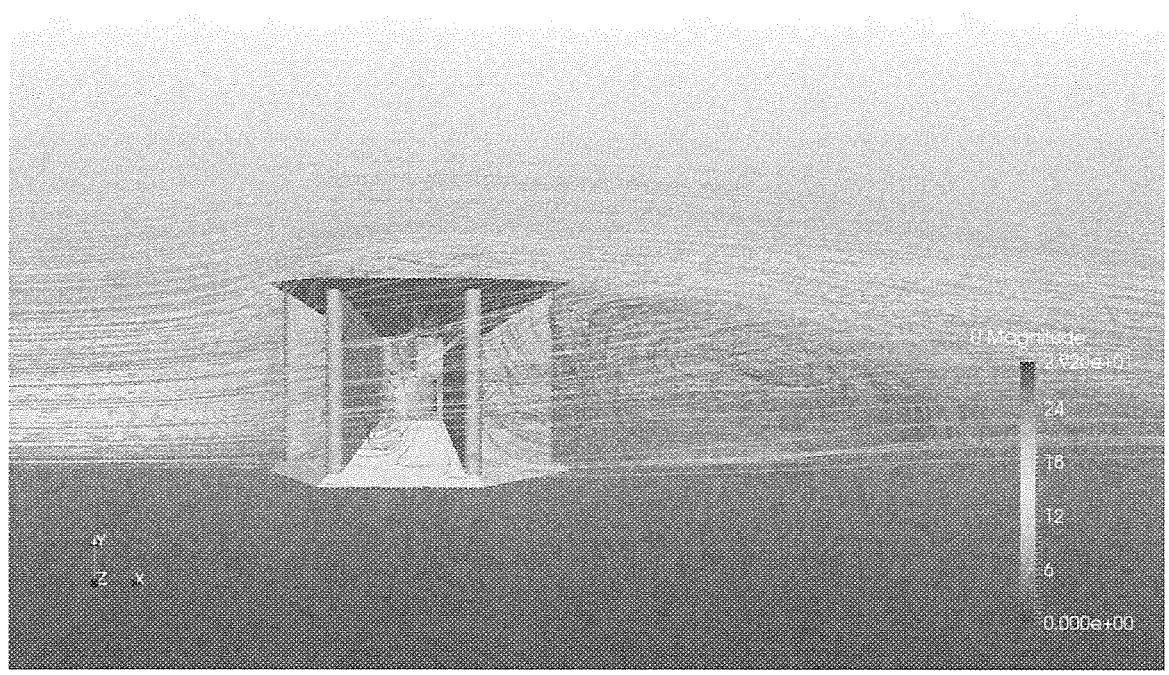
FIGS. 13A, 13B, and 13C are each computer-generated views of air flow through the vertical axis wind turbine illustrated in FIGS. 9A and 9B.
Figure 13B:
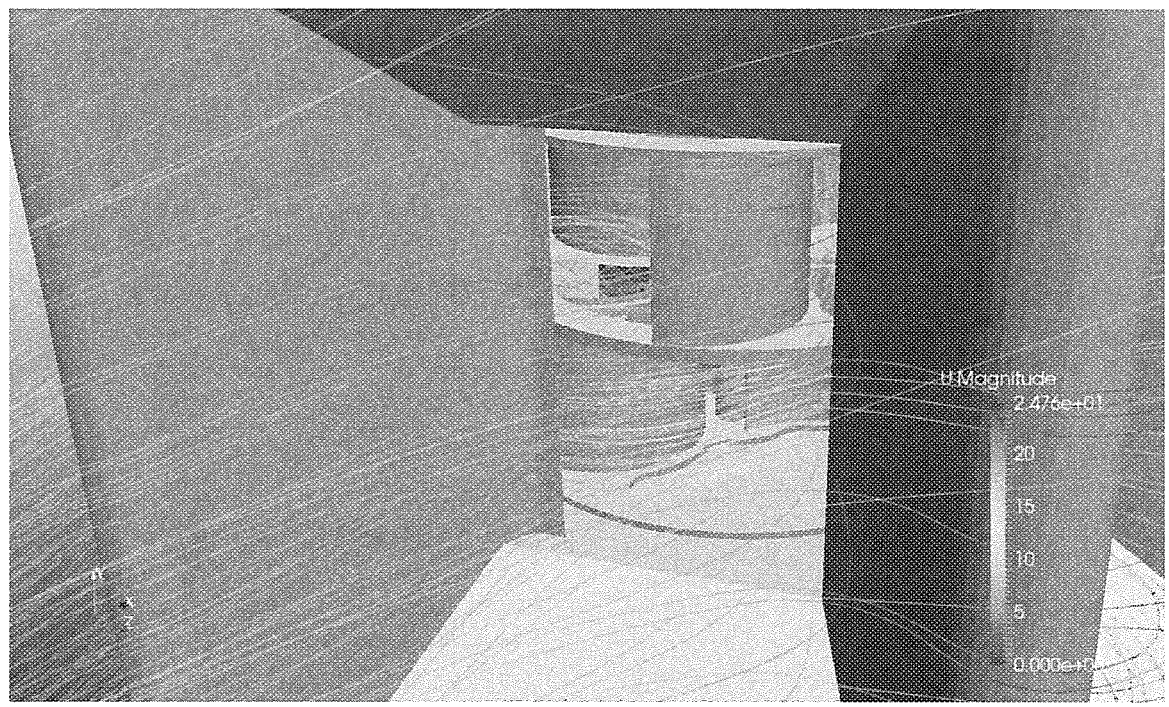
Figure 13C:
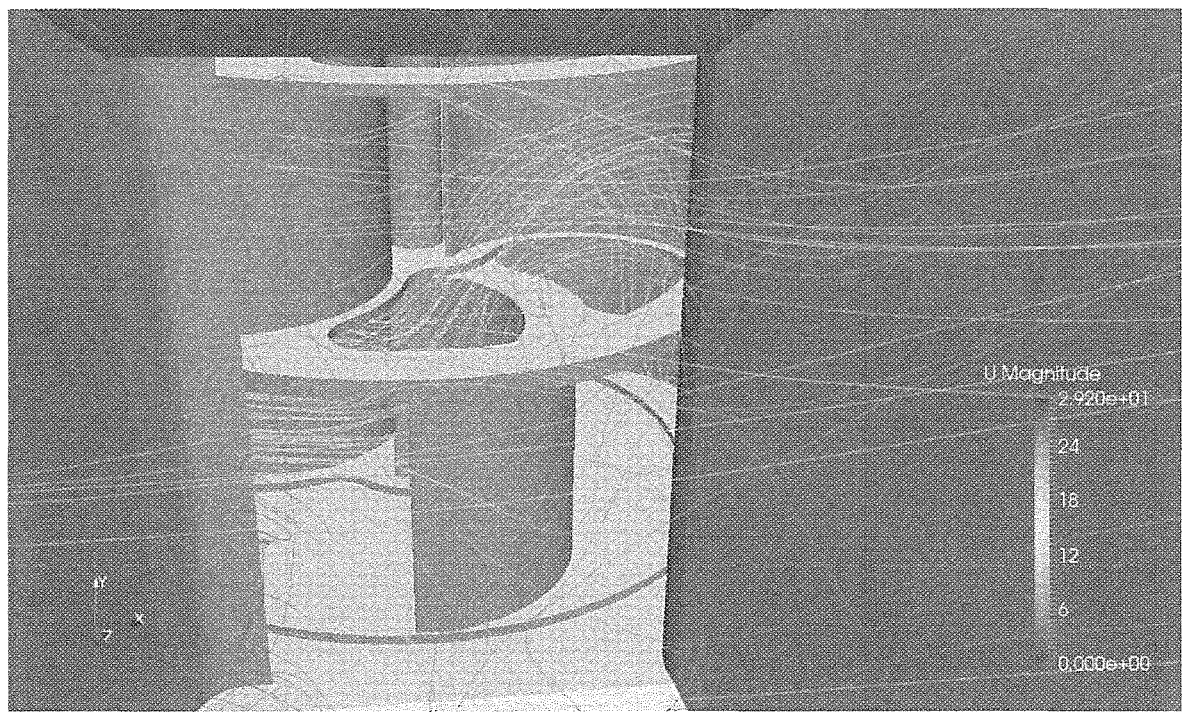

Referring now to FIGS. 13A, 13B, and 13C, air flow through the embodiment of FIGS. 9A and 9B is illustrated.

Figure 14:
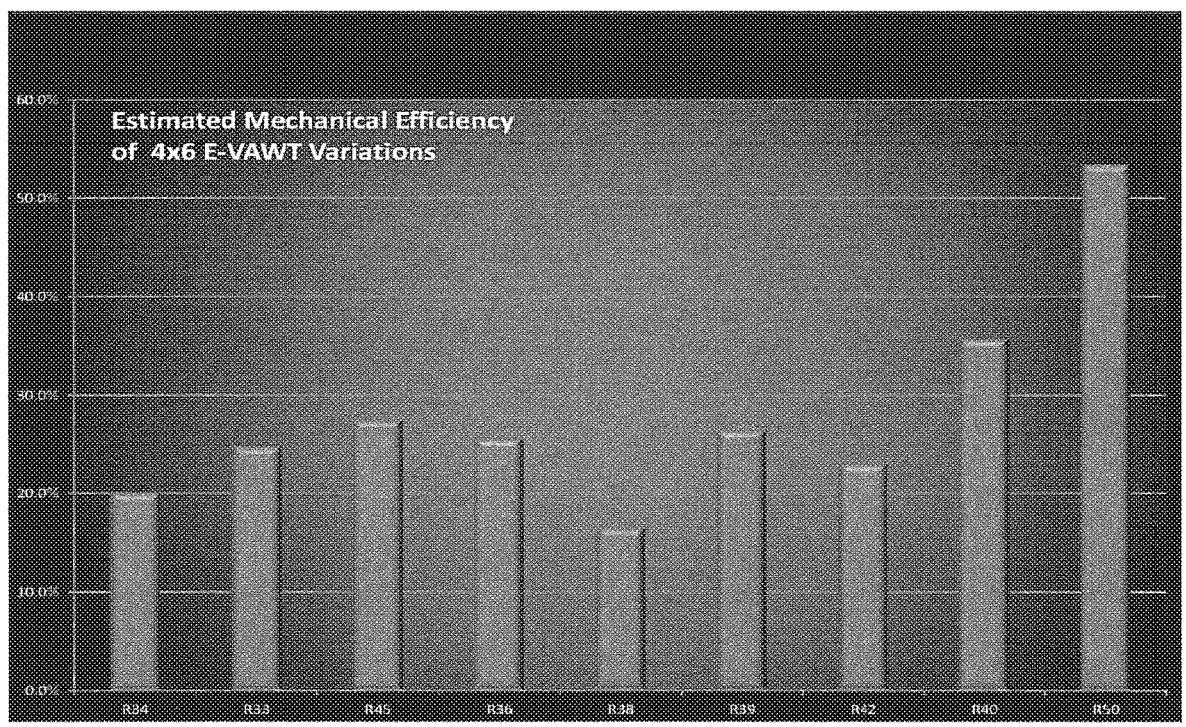
FIG. 14 is a bar graph showing the mechanical efficiency of vertical axis wind turbines according to various embodiments of the present disclosure.

Referring now to FIG. 14, the mechanical efficiency of various embodiments is illustrated. Specifically, the bar labeled R34 refers to the embodiment illustrated in FIG. 2; the bar labeled R33 refers to the embodiment illustrated in FIGS. 1A and 1B; the bar labeled R36 refers to the embodiment illustrated in FIG. 3; the bar labeled R38 refers to the embodiment illustrated in FIG. 5; the bar labeled R39 refers to the embodiment illustrated in FIG. 6; the bar labeled R42 refers to the embodiment illustrated in FIG. 8; the bar labeled R40 refers to the embodiment illustrated in FIG. 7; and the bar labeled R50 refers to the embodiment illustrated in FIGS. 9A and 9B. The bar labeled R45 refers to an embodiment not specifically illustrated in the Drawings but within the scope of this disclosure. These efficiency values were calculated based on computational fluid dynamics (CFD) analyses which simulated wind flow and wind loading on the various features of the several embodiments. As FIG. 14 illustrates, the embodiment illustrated in FIG. 7 and the embodiment illustrated in FIGS. 9A and 9B are most efficient. One of ordinary skill in the art, however, will recognize that various other embodiments and features of embodiments may be suitable for particular applications.

Vertical axis wind turbines have been proposed to address the problem in wind direction. In vertical axis wind turbines a rotor assembly rotates typically on bearing assemblies affixed to a rotor shaft and supported by a base. See, e.g., U.S. Pat. Nos. 1,697,574 and 1,766,765 to Savonius and U.S. Pat. No. 1,835,018 to Darrieus. Prior art designs, however, suffer from poor efficiency and starting problems, have vertical rotors that do not rotate fast enough, have insufficient rotor tip velocities, and complex and expensive rotor blade designs. Conventional vertical wind turbines, despite being capable of operating from wind coming from any direction, have not been as widely used in generation of energy as have horizontal turbines, due to one or more of the above referenced problems. The present invention, however, addresses such deficiencies and thus provides a superior device and method for generating electrical energy.

Certain embodiments of the present invention include a wind turbine apparatus comprising a generator, a substantially vertical shaft, the shaft being adapted to be directly mounted to the generator for rotating the generator, a plurality of shaped blades associated with the shaft, and in some embodiments, an electronic control apparatus for controlling the speed of rotation of the generator by controlling loading of the generator. In certain embodiments, a permanent magnet synchronous generator is employed where at least one permanent magnet comprises at least one rare earth metal. In other embodiments, at least one of the stators, blades, and base and top wind deflector panels (e.g. when a hexagonal construct is used) are adjustable in terms of one of: size, length, extension (such as by having telescoping elements adjustable in view of wind conditions), angle, shape, ribbing, canting, and temperature (e.g. so as to melt ice or snow thereon). In various embodiments, a control apparatus or controller for controlling operation of at least one vertical wind turbine (and in certain embodiments, two or more stacked turbines) includes a processor to optimize rotation based on wind speed and power output, tip speed, and/or positioning of the rotor and the stator of the generator such that a predetermined relation between the wind speed and tip speed and/or power output is maintained.

The controller may, additionally or alternatively, control other aspects or parameters of the vertical axis wind turbine or systems comprising vertical axis wind turbines. By way of first non-limiting example, the controller may be operable to control mechanical parameters of the generator; particularly, where the generator is an alternator (i.e. a generator producing alternating current), the controller may be operable to control the number of poles, rotational speed, and/or frequency of the alternator. By way of second non-limiting example, the controller may be operable to control the output voltage of the electrical generator, e.g. by reconfiguring a voltage regulator. By way of third non-limiting example, the vertical axis wind turbine (or system comprising a vertical axis wind turbine) may comprise, in addition to the controller, a mechanical and/or electronic braking mechanism for either the rotor blades 140/240, the generator shaft, or both, and the controller may be operable to apply the braking mechanism to slow the rotation of the rotor blades 140/240, the generator shaft, or both when the rotational speed exceeds a predetermined value.

Various embodiments are adapted to be ground secured units, while other embodiments provide wind turbine devices adapted for positioning on a roof, pole, scaffold or on a mast, and preferably include a telecommunications or other remote control functionalities such that remote control of the units can be achieved to maximize efficiencies and power output. Still other embodiments provide for protective shields to be put in place, preferably via remote control, such that the units are protected from certain environmental conditions when desired, such as in extremely high winds, storms, etc. The units can be made from any suitable material, but in certain embodiments, they comprise a majority of plastic or composite portions to reduce weight, to facilitate manufacture and to promote use when weight characteristics are paramount. Thus many embodiments include those made form from at least one of plastic material, composite material, laminate material, fiberglass and aluminum.

The power generation system may comprise a local grid, means for converting from AC to DC voltage between the at least one wind turbine apparatus and the local grid, a local energy storage connected to the local grid, at least one further local energy production apparatus, and a connection to another grid. Directing the output of such units to a storage facility or to charge batteries is also contemplated.

Similarly, the provision of photovoltaic panels as part of the wind turbine constructs is rendered possible due to the expansive panels of the base and top portions (in certain embodiments), including the uppermost portion of the units that will be exposed to sunlight, thus facilitating energizing of the units with the assistance of solar powered systems. By way of first non-limiting example, a photovoltaic panel may be placed on a suitable portion of the surface of the amplifier skirt 160/260. By way of second non-limiting example, the amplifier skirt 160/260 may itself be a photovoltaic panel, i.e. may perform the dual function of shaping incoming wind into the rotor blades 140/240 while simultaneously producing solar energy. In certain embodiments in which vertical axis wind turbines of the invention include, or are integrated with, photovoltaic systems, a controller may be operable to synchronize alternating current waveforms of the wind-generated current and the solar-generated current, and may in embodiments be enabled to synchronize the total electrical output of the vertical axis wind turbine system with an electrical grid or network to which the vertical axis wind turbine system is interconnected.

Embodiments of vertical axis wind turbines according to the present invention may comprise, or be configured to work with, a gearbox, which converts the rotation of the rotor blades 140/240 into a rotation (usually at a faster rotational speed) of an electrical generator to produce electricity. However, in many embodiments, it is possible and may be desirable for a "direct-drive" system to be provided, in which the shaft turned by the rotor blades 140/240 is directly interconnected to an electrical generator, without an intermediate gearbox, such that the generator spins at the same speed as rotor blades 140/240; typically (but not always), the slower rotational speed of the generator is compensated for by increasing the diameter of the generator's rotor to allow for the inclusion of more magnets to create the required frequency and power. Such "direct-drive" vertical axis wind turbines may be preferred over generation systems comprising a gearbox for various reasons, including, by way of non-limiting example, increased efficiency, reduced noise, longer lifetime, higher torque at low rotational speeds, faster and more precise positioning, drive stiffness, and avoidance of certain mechanical issues to which gearboxes may be particularly susceptible (e.g. accumulated fatigue torque loading, reliability issues, maintenance costs, etc.). Thus, it is to be expressly understood that the scope of the present invention includes both vertical axis wind turbine systems comprising (or adapted to interface with) a generator system comprising a gearbox, and vertical axis wind turbine systems comprising (or adapted to interface with) a direct-drive generator system (e.g. a permanent magnet synchronous generator). These and other embodiments may also provide vertical axis wind turbine systems according to the present invention having fewer moving parts than those of the prior art, further reducing maintenance needs and costs and improving the useful life of the turbine system.

The invention illustratively disclosed herein suitably may be practiced in the absence of any element which is not specifically disclosed herein. It is apparent to those skilled in the art, however, that many changes, variations, modifications, other uses, and applications of the invention are possible, and also changes, variations, modifications, other uses, and applications which do not depart from the spirit and scope of the invention are deemed to be covered by the invention, which is limited only by the claims which follow. The foregoing discussion of the invention has been presented for purposes of illustration and description. The foregoing is not intended to limit the invention to the form or forms disclosed herein. In the foregoing Detailed Description of Certain Embodiments of the Invention, for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description of Certain Embodiments of the Invention, with each claim standing on its own as a separate preferred embodiment of the invention.

Moreover, though the description of the invention has included description of one or more embodiments and certain variations and modifications, other variations, combinations, and modifications are within the scope of the invention, e.g. as may be within the skill and knowledge of those in the art, after understanding the present disclosure. It is intended to obtain rights which include alternative embodiments to the extent permitted, including alternate, interchangeable, and/or equivalent structures, functions, ranges, or steps to those claimed, whether or not such alternate, interchangeable, and/or equivalent structures, functions, ranges, or steps are disclosed herein, and without intending to publicly dedicate any patentable subject matter.

The invention claimed is:

1. A vertical axis wind turbine, comprising:
   at least one rotor blade adapted to turn a shaft;
   a rotationally symmetric stator skirt, wherein at least a portion of a wind-facing surface of the stator skirt is parabolic, and wherein the stator skirt has a horizontal cross-section of an ellipse; and
   at least one stator fin, each stator fin being attached at a bottom of the stator fin to the stator skirt and comprising a fin flip, the fin flip being disposed at an angle of β relative to a longitudinal axis of the stator fin and adapted to compress wind and direct the wind to the at least one rotor blade in a predetermined direction,
   wherein a height-to-width ratio of the vertical axis wind turbine is between 0.1 and 3.0.

2. The vertical axis wind turbine of claim 1, wherein the predetermined direction is counterclockwise.

3. The vertical axis wind turbine of claim 1, wherein the at least one rotor blade comprises three rotor blades.

4. The vertical axis wind turbine of claim 1, wherein at least one of a leading vertical face and a trailing vertical face of each rotor blade is arcuate or parabolic.

5. The vertical axis wind turbine of claim 1, wherein the at least one stator fin comprises three stator fins.

6. The vertical axis wind turbine of claim 1, wherein the wind-facing surface of the stator skirt comprises a lower conical portion and an upper parabolic portion.

7. The vertical axis wind turbine of claim 1, wherein an angle α between the wind-facing surface of the stator skirt and a horizontal axis, as measured by an average or at any point of the stator skirt, is less than 45° or more than 55°.

8. The vertical axis wind turbine of claim 7, wherein angle α is between 35° and 10° or between 55° and 65°.

9. The vertical axis wind turbine of claim 1, wherein the ellipse is a circle.

10. A vertical axis wind turbine, comprising:
at least one rotor blade adapted to turn a shaft;
a rotationally symmetric stator skirt, wherein at least a portion of a wind-facing surface of the stator skirt is parabolic, and wherein the stator skirt has a horizontal cross-section of an ellipse;
a rotationally symmetric amplifier skirt, wherein at least a portion of a wind-facing surface of the amplifier skirt is parabolic, and wherein the amplifier skirt has a horizontal cross-section of an ellipse; and
at least one stator fin, each stator fin being attached at a bottom of the stator fin to the stator skirt and comprising a fin flip, the fin flip being disposed at an angle of β relative to a longitudinal axis of the stator fin and adapted to compress wind and direct the wind to the at least one rotor blade in a predetermined direction,
wherein a height-to-width ratio of the vertical axis wind turbine is between 0.1 and 3.0.

11. The vertical axis wind turbine of claim 10, wherein at least one of a leading vertical face and a trailing vertical face of each rotor blade is arcuate or parabolic.

12. The vertical axis wind turbine of claim 10, wherein the wind-facing surface of the amplifier skirt comprises an upper conical section and a lower parabolic section.

13. The vertical axis wind turbine of claim 10, wherein at least one of the ellipse of the stator skirt and the ellipse of the amplifier skirt is a circle.

14. A vertical axis wind turbine, comprising:
at least one rotor blade adapted to turn a shaft;
at least one rotor plate attached to the at least one rotor blade at one or both of a top and a bottom of the at least one rotor blade;
a rotationally symmetric stator skirt, supporting the at least one rotor plate and comprising N identical trapezoidal panels, each trapezoidal panel forming an angle α with respect to a horizontal axis, the stator skirt having a horizontal cross-section of a regular polygon having N sides;
at least one stator fin, each stator fin being attached at a bottom of the stator fin to the stator skirt and comprising a fin flip, the fin flip being disposed at an angle of β relative to a longitudinal axis of the stator fin and adapted to compress wind and direct the wind to the at least one rotor blade in a predetermined direction; and
a top frame, attached to a top of each stator fin,
wherein angle α is less than 45° or more than 55°.

15. The vertical axis wind turbine of claim 14, wherein the predetermined direction is counterclockwise.

16. The vertical axis wind turbine of claim 14, wherein the at least one rotor blade comprises three rotor blades.

17. The vertical axis wind turbine of claim 14, wherein each of a leading vertical face and a trailing vertical face of each rotor blade is semielliptical.

18. The vertical axis wind turbine of claim 14, wherein angle α is one of (i) more than 12° and less than 45° and (ii) more than 55° and less than 80°.

* * * * *